United States Patent [19]

Kurumaji et al.

[11] Patent Number: 5,071,603

[45] Date of Patent: Dec. 10, 1991

[54] METHOD OF CONTROLLING HYDRAULIC PRESS

[75] Inventors: Masanobu Kurumaji; Naoki Takeuchi, both of Kobe; Tutomu Sano, Toyonaka; Kazuyuki Kajiyama, Akashi; Noriharu Nakagawa, Neyagawa; Hiroaki Kondo, Kobe; Etujiro Imanishi, Higashinada; Hiroshi Ueda, Kobe; Yoshihiro Fukuda, Kamakura, all of Japan

[73] Assignee: Kabushiki Kaisha Kobe Seiko Sho, Kobe, Japan

[21] Appl. No.: 283,925

[22] Filed: Dec. 13, 1988

[30] Foreign Application Priority Data

| Dec. 14, 1987 | [JP] | Japan | 62-316468 |
| Dec. 14, 1987 | [JP] | Japan | 62-316469 |
| Dec. 14, 1987 | [JP] | Japan | 62-316470 |
| Dec. 14, 1987 | [JP] | Japan | 62-316471 |
| Apr. 7, 1988 | [JP] | Japan | 63-86792 |
| Apr. 11, 1988 | [JP] | Japan | 63-89444 |
| Apr. 19, 1988 | [JP] | Japan | 63-97832 |
| Dec. 6, 1988 | [JP] | Japan | 63-15437 |

[51] Int. Cl.[5] .......................................... B29C 45/80
[52] U.S. Cl. ............................ 264/40.5; 264/328.7; 425/149; 425/150
[58] Field of Search ................. 264/40.1, 40.5, 40.7, 264/328.7; 425/149, 150

[56] References Cited

U.S. PATENT DOCUMENTS

| 3,825,386 | 7/1974 | Bello et al. | 425/406 |
| 4,076,780 | 2/1978 | Ditto | 264/40.5 |
| 4,470,787 | 9/1984 | Gram | 425/150 |
| 4,648,823 | 3/1987 | Yashima | 100/46 |
| 4,726,920 | 2/1988 | Yokota | 264/40.5 |
| 4,784,058 | 11/1988 | Nakagawa et al. | 100/46 |

FOREIGN PATENT DOCUMENTS

| 3401203 | 1/1984 | Fed. Rep. of Germany . |
| 2185500 | 1/1974 | France . |
| 51-26943 | 8/1976 | Japan . |
| 56-17168 | 4/1981 | Japan . |
| 59-23920 | 6/1984 | Japan . |
| 60-8021 | 1/1985 | Japan . |
| 60-15119 | 1/1985 | Japan . |
| 61-242795 | 10/1986 | Japan ................................. 425/150 |
| 62-9799 | 1/1987 | Japan . |
| 62-95205 | 5/1987 | Japan . |
| 2193681 | 2/1988 | United Kingdom ................ 425/150 |

OTHER PUBLICATIONS

Kunststoffe, vol. 74, No. 9, Sep. 1984, pp. 527-530, Munich, Germany; H. Cherek et al., "Einsatz adaptiver Regelungen beim Pressen von SMC".

Primary Examiner—Jill L. Heitbrink
Attorney, Agent, or Firm—Oblon, Spivak, McClelland, Maier & Neustadt

[57] ABSTRACT

A method of controlling a hydraulic press wherein changing over from velocity control to pressure control can be effected at an optimum point of time in accordance with a condition of material being filled. When a movable mold half of a metal mold is moved by a hydraulic cylinder to compression mold a work within a cavity defined in the metal mold, the velocity of movement of the mold half by the hydraulic cylinder is controlled until pressurization of the work is started, but after starting of the pressurization, the pressurizing force of the hydraulic cylinder is controlled. During the velocity control, a parameter which varies as the compression proceeds is successively detected during the velocity control, and changing over from the velocity control to the pressure control is effected at a point of time when the detected parameter coincides with a preset value—that is, when the work is fully filled in the cavity. A device for controlling a hydraulic press is also disclosed wherein optimal pressure control can be assured in accordance with a current condition of material for molding.

2 Claims, 16 Drawing Sheets

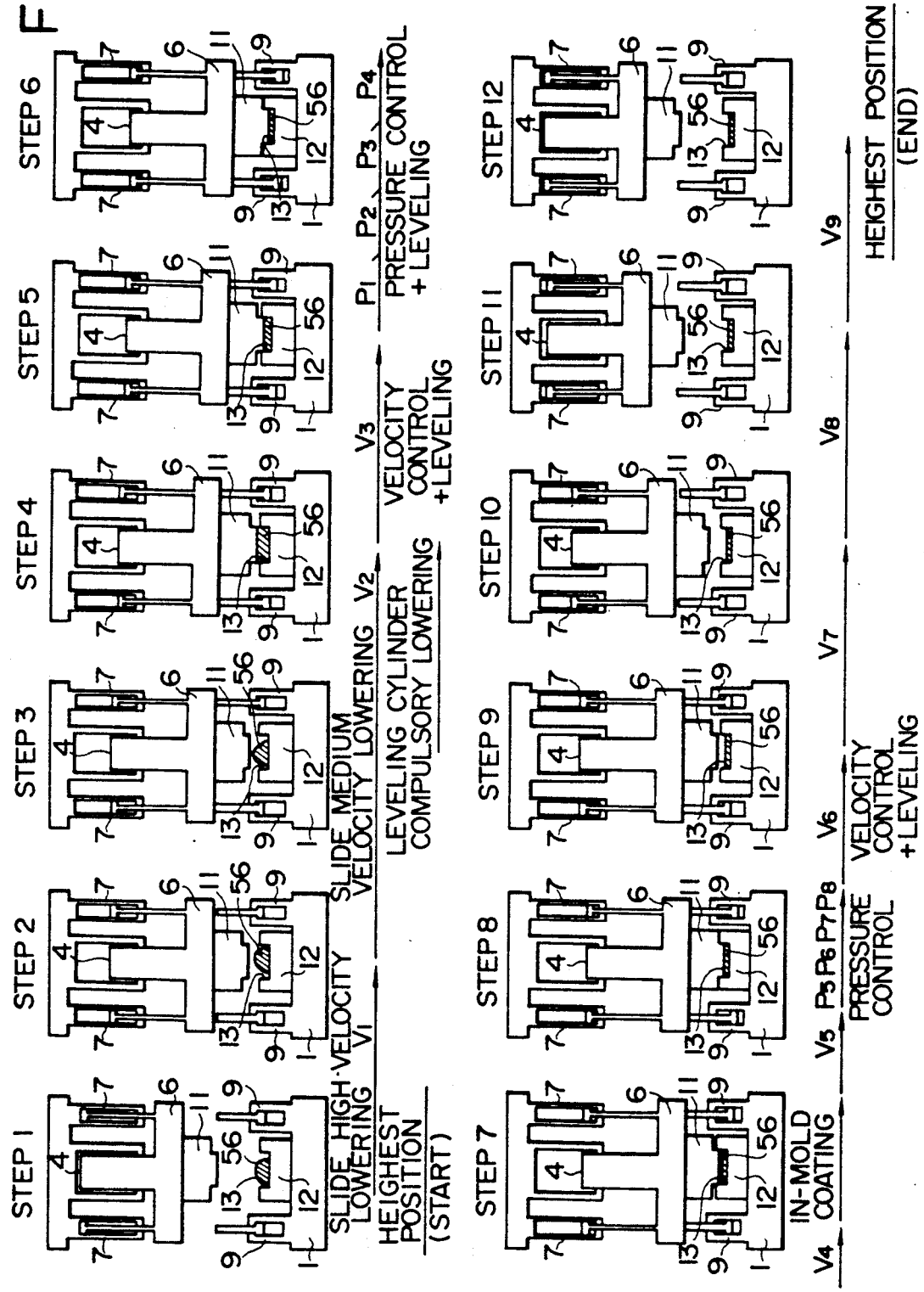

t1 : NO LOAD LOWERING TIME
t2 : SLOW LOWERING TIME
t3 : FILLING TIME
t4 : POSITION CONTROLLING TIME
t5 : PRESSURIZING TIME
t6 : MOLD SEPARATING TIME
t7 : LIFTING TIME

BEFORE SUPPLY   FILLING CONDITION AT STEP 5

METHOD OF CONTROLLING HYDRAULIC PRESS

BACKGROUND OF THE INVENTION

1. Field of the Invention

This invention relates to a method of and a device for controlling a hydraulic press for compression molding a work.

2. Description of the Prior Art

Hydraulic presses are already known wherein a slide is moved by a hydraulic cylinder to compression mold a work. Such hydraulic presses are divided into various types depending upon a material and a shape of a work to be worked.

In order to compression mold a front panel, a body panel or a like part of an automobile using an SMC (Sheet Molding Compound) which is a thermosetting material in the form of a sheet, such a hydraulic press as disclosed, for example, in Japanese Patent Laid-Open No. 60-15119 is conventionally used.

The conventional hydraulic press disclosed includes a base, an upright mounted uprightly on the base, a crown provided at an upper portion of the upright, a hydraulic cylinder provided on the crown, and a slide supported at a lower end of a rod of the hydraulic cylinder for up and down movement under the guidance of the upright, whereby a lower metal mold half is secured to an upper face of the base while an upper metal mold half is secured to a lower face of the slide, and resin material is compression molded within a cavity defined between the upper and lower metal mold halves.

In compression molding an SMC material with the conventional hydraulic press, the hydraulic cylinder is controlled conventionally in such a manner as illustrated in FIG. 16. In particular, referring to FIG. 16, velocity control for controlling the velocity of the hydraulic cylinder at a plurality of stages is adopted for a period of time ($t_1$, $t_2$ and $t_3$) until the slide is moved down from its top dead center to effect mold closing, and pressure control wherein the pressurizing force of the hydraulic cylinder is maintained fixed is adopted for another period of time ($t_4$ and $t_5$) until completion of compression molding after material has been filled into the cavity of the metal mold. Finally for a further period of time ($t_6$ and $t_7$) from completion of compression molding to mold opening, velocity control is adopted again.

In compression molding of resin material, it is important to effect pressure control of resin material in accordance with a variation in condition of the resin material.

The prior art, however, has a drawback that, because the pressurizing force of the press is fixed in pressure control, the press cannot follow a variation in condition of resin material and accordingly good molded articles cannot be produced.

In particular, the pressure of SMC material varies in such a manner as shown in FIG. 15. As seen in FIG. 15, the pressure rises suddenly at the instant when the metal mold half is contacted with the resin material so that the resin material is flowed in and fills up the cavity of the metal mold halves. After completion of such filling of the resin material, the SMC material is heated by an influence of the temperature of the metal mold halves and thus expanded in volume as seen in a zone denoted at a in FIG. 15. The SMC material then shrinks as seen in another zone denoted at b in FIG. 15, and finally it cures at a stage denoted at c in FIG. 15. A material which undergoes expansion, shrinkage and cure such as an SMC material thus varies in behavior and in pressure within a mold.

With conventional presses, however, pressure is constant and is not applied in accordance with a pressure of resin material. Accordingly, optimal pressure control for different conditions cannot be attained, and if pressure control is not appropriate, molded articles will have defects such as sinks and cracks and cannot be produced with a high quality.

Accordingly, in compression molding of a thermosetting resin material, appropriate transition from velocity control to pressure control and maintenance of an appropriate pressure in pressure control are very important.

Transition from velocity control to pressure control, however, is conventionally effected by changing over the velocity of movement of the slide at a plurality of stages in such a manner as shown in FIG. 17.

With the manner of changing over of the velocity, the velocity presents a discontinuous variation at each of such changing over points. Consequently, smooth deceleration of the slide cannot be attained and the metal mold half may be contacted too fast or too slowly with the resin material or may be contacted with the resin material while being vibrated. As a result, the resin material may not appropriately be filled up in the metal mold halves, which will have a bad influence on pressure control after then.

Further, depending upon a kind of resin material, it is necessary to move down the slide at a high velocity and then decelerate the slide rapidly and smoothly at a final stage of the downward movement. Such movement, however, cannot be attained with such a conventional multi-stage deceleration pattern as described above. Accordingly, it is a problem of the conventional presses that optimum molding cannot be assured for each resin material.

Changing over from velocity control to pressure control in the conventional hydraulic press described above is conventionally made by a setup of a timer.

Such a conventional change-over of control by a timer has following drawbacks.

In particular, in order to obtain excellent results with a pressure control within a range denoted at $t_5$ in FIG. 16, it is necessary for resin material (SMC) to be completely filled in a metal mold. According to the change-over of control by a timer, however, control is changed over to pressure control only in response to an external factor (timer) whether resin material is filled up in a metal mold or not. Consequently, satisfactory results are not obtained by the conventional change-over of control by a timer.

For example, where the periods of time $t_3$ and $t_4$ shown in FIG. 16 are set too short, pressure control will be entered before material is filled up in a metal mold. Consequently, the resin material in the metal mold will not be acted upon by a pressure, and in an extreme case, this will give rise to such problems as an occurrence of a short shot or a crack.

On the contrary, where the periods of time $t_3$ and $t_4$ are set too long, resin material is filled up into a metal mold and begins to be heated and cure before a pressure is applied to the resin material. Thus, when a pressure is actually applied to the resin material, it will not act upon the entire resin material because the resin material has partially cured already. Consequently, a molded article having a sufficient strength cannot sometimes be obtained.

The change-over of control by a timer described above thus depends upon an assumption that resin material thrown into a metal mold is fully filled in the metal mold.

In recent years, further uniform molding is demanded with minimized burr, and supply of resin material is not fixed for each molding. Thus, it is not known clearly whether resin material is filled in a similar manner for each molding cycle, and consequently the assumption is not met satisfactorily.

In particular, the control by a timer described above is a one-sided controlling method which ignores the fact that filling conditions vary for each molding.

When, for example, flat plates are to be molded, resin material may be filled in different conditions in a metal mold or may be placed in different locations in a cavity of a metal mold. For example, resin material may be placed to a rather leftwardly displaced location within a cavity of a metal mold as shown in FIG. 18, or to a rather rightwardly displaced location as shown in FIG. 19. Besides, the amount of thus filled resin material may vary. Consequently, molded articles may vary in thickness or density, and only molded articles which are different from each other in a strict sense are obtained by different molding cycles.

As means for avoiding this to obtain molded articles as uniform as possible, a molding method is conventionally employed wherein an excessive amount of resin material is thrown into a metal mold so as to cause so-called burr to be produced on a molded article. The molding method, however, is inconsistent with the aforementioned requirement to minimize burr and thus deteriorates productivity significantly.

Also it is a problem of the prior art that, in pressure control, resin material is conventionally pressurized by a substantially fixed pressure as seen in FIG. 16 and consequently, good molded articles cannot be produced with a resin material which exhibits a variation in condition of expansion, shrinkage and cure.

OBJECTS OF THE INVENTION

It is an object of the present invention to provide a method of and a device for controlling a hydraulic press wherein optimal pressure control can be assured in accordance with a current condition of material for molding.

It is another object of the present invention to provide a method of controlling a hydraulic press wherein changing over from velocity control to pressure control can be effected at an optimum point of time in accordance with a condition of material being filled.

It is a further object of the present invention to provide a method of controlling a hydraulic press wherein resin material being filled in a metal mold is acted upon uniformly by a predetermined pressure to assure production of molded articles of a uniform quality.

It is a still further object of the present invention to provide a method of controlling a hydraulic press wherein transition from velocity control to pressure control can be made smoothly and, in pressure control, a pressure is applied to resin material in accordance with a condition of the resin material to attain production of good molded articles.

SUMMARY OF THE INVENTION

In order to attain the objects, according to one aspect of the present invention, there is provided a method of controlling a hydraulic press of the type wherein, when at least one of a pair of metal mold halves is moved by a hydraulic cylinder to compression mold a work within a cavity defined between the metal mold halves, the velocity of movement of the metal mold half by the hydraulic cylinder is controlled until pressurization of the work is started, but after starting of the pressurization, the pressurizing force of the hydraulic cylinder is controlled, wherein a parameter which varies as the compression proceeds is successively detected during the velocity control, and changing over from the velocity control to the pressure control is effected at a point of time when the detected parameter coincides with a preset value.

The parameter may be any of an internal pressure of the hydraulic cylinder, a position of a movable member which is moved by the hydraulic cylinder, an internal pressure of the cavity, a velocity of the metal mold half and so on.

With the controlling method, changing over from the velocity control to the pressure control is effected at a point of time when a detected value of the parameter coincides with a preset value which is a value of the parameter at a point of time when the work is filled up in the cavity. The preset value is obtained in advance through experiments or the like.

Accordingly, at a point of time just when a work is filled up in the cavity of the metal mold, control of movement of the metal mold half by the hydraulic cylinder is changed over from velocity control to pressure control. Consequently, changing over from velocity control to pressure control is effected appropriately, and in pressure control after then, the pressurizing force of the hydraulic cylinder acts sufficiently upon the work. As a result, molded articles thus obtained are improved in strength, accuracy in dimension and so on.

According to another aspect of the present invention, there is provided a method of controlling a hydraulic press of the type wherein, when at least one of a pair of metal mold halves is moved by a hydraulic cylinder to compression mold a work within a cavity defined between the metal mold halves, the velocity of movement of the metal mold half by the hydraulic cylinder is controlled until pressurization of the work is started, but after starting of the pressurization, the pressurizing force of the hydraulic cylinder is controlled, wherein an internal pressure of the cavity is detected at a predetermined stroke position of the hydraulic cylinder during the velocity control, and then the detected internal pressure of the cavity is compared with a preset value for the predetermined stroke position to obtain a difference between them, whereafter control of the hydraulic cylinder is changed over from velocity control to pressure control at a point of time just when the hydraulic cylinder is moved by an amount corresponding to the difference from the predetermined stroke position.

With the controlling method, changing over from velocity control to pressure control proceeds in the following procedure.

At first, an internal pressure of the cavity is detected at a predetermined stroke position of the hydraulic cylinder during velocity control. The internal pressure of the cavity at the predetermined stroke position exhibits almost fixed values in accordance with filling conditions of a work in the cavity, and such values are obtained in advance through experiments or the like. Accordingly, if the detected internal pressure of the cavity is compared with a preset value for the predetermined stroke position, then a current filling condition of resin at the stroke position can be identified through such comparison.

In other words, if the detected pressure and the preset pressure are compared with each other to obtain a difference between them, it can be estimated by what amount the metal mold half should be moved by the hydraulic cylinder after then until resin is filled up in the cavity.

Accordingly, if the hydraulic cylinder is operated by an amount corresponding to the difference, resin will be filled up in the cavity. Then, if control of the hydraulic cylinder is changed over from velocity control to pressure control at this point of time, uniform molding can be attained. Consequently, control can be changed over normally when resin is filled up in the metal mold independently of an amount or manner of supply of resin.

According to a further aspect of the present invention, there is provided a method of controlling a hydraulic press of the type wherein, when at least one of a pair of metal mold halves is moved by a hydraulic cylinder to compression mold a work within a cavity defined between the metal mold halves, the velocity of movement of the metal mold half by the hydraulic cylinder is controlled until pressurization of the work is started, but after starting of the pressurization, the pressurizing force of the hydraulic cylinder is controlled, wherein changing over from the velocity control to the pressure control is effected at a point of time when the hydraulic cylinder is moved to a position of a predetermined stroke value $Z_0$ and an internal pressure P of the cavity is detected upon such changing over and is compared with a predetermined preset internal pressure $P_0$ to obtain a stroke modifying amount $\overline{V}Z$ for modifying the internal pressure P of the cavity to the predetermined internal pressure $P_0$ in accordance with an equation $$\overline{VZ} = \alpha(P_0 - P)$$

where $\alpha$ is a coefficient, and then a stroke value of the hydraulic cylinder at which changing over from velocity control to pressure control is to be effected in a subsequent next molding cycle is modified to $Z_0 + \overline{V}Z$, and wherein such modification is repeated for each molding cycle.

With the controlling method, changing over from velocity control to pressure control is effected in response to a stroke position of the hydraulic cylinder detected by a suitable means.

In particular, at first a stroke position $Z_0$ of the hydraulic cylinder at which it is estimated that a predetermined fixed amount of resin fills up the cavity of the metal mold and an internal pressure $P_0$ of the cavity 13 are set. The preset values $Z_0$ and $P_0$ can be determined in advance through pre-molding, experiments or calculations.

Then in actual operation, at first in the first compression molding, control is changed over from velocity control to pressure control when the stroke of the hydraulic cylinder reaches the preset value $Z_0$. Simultaneously, an internal pressure P of the cavity is detected. The detection value P is compared with the preset internal pressure value $P_0$.

In case the detection value P is equal to the preset value $P_0$, it is determined that resin is fully filled in the cavity as expected. Accordingly, also in a subsequent next molding cycle, control is changed over when the hydraulic cylinder is moved to the preset stroke position $Z_0$.

To the contrary, in case the detection value P is smaller than the preset value $P_0$, it is determined that resin is not yet filled up in the cavity.

Thus, in a subsequent next molding cycle, the point at which control is to be changed over is corrected. The amount $\overline{V}Z$ for correction is calculated in accordance with an equation $VZ = \alpha(P_0 - P)$. The coefficient $\alpha$ is determined through experiments or the like in advance.

Accordingly, in the next molding cycle, control is changed over from velocity control to pressure control when the stroke position of the hydraulic cylinder reaches $Z_0 + \overline{V}Z$.

On the contrary, in case the detection value P is greater than the preset value $P_0$, it is considered that resin is filled by an excessive amount in the cavity. Also in this instance, the stroke position at which control is to be changed over is similarly corrected to $Z_0 + \overline{V}$ for a subsequent next molding cycle.

Then, also in the second molding cycle, an internal pressure P of the cavity is detected and compared with the preset value $P_0$ to effect similar correction of the stroke value.

As such correction is repeated in successive molding cycles, an appropriate stroke position at which control is to be changed over can be found out.

With the controlling method, a timing at which control of the hydraulic cylinder is to be changed over is modified by the machine itself in accordance with a parameter of the same, and the machine itself finds out an optimal molding condition. Accordingly, modifying operations which are conventionally effected by hand can be reduced significantly, resulting in improvement in production efficiency. Besides, changing over from velocity control to pressure control can be effected appropriately, and in pressure control after then, the pressurizing force of the hydraulic cylinder can act sufficiently upon a work. Accordingly, molded articles thus obtained can be improved in strength, accuracy in dimension and so on.

According to a still further aspect of the present invention, there is provided a method of controlling a hydraulic press of the type wherein, when a slide is moved by a hydraulic cylinder to compression mold a work, the velocity of movement of the slide by the hydraulic cylinder is controlled until pressurization of the work is started, but after starting of the pressurization, the pressurizing force of the hydraulic cylinder is controlled, wherein the pressure control is effected at a plurality of stages in accordance with a change in condition of a work.

With the controlling method, pressure control after changing over from velocity control is effected at a plurality of stages in accordance with a change in condition of a work. Accordingly, during compression molding, the pressurizing force will be maintained at an optimum level.

A change in condition of the work is obtained in advance through experiments or the like, and a variation in condition in accordance with passage of time is grasped. The multi-stage control is thus effected in accordance with a preset time schedule.

A change in condition of a work may be detected from a pressure of the work or a hydraulic pressure of the hydraulic cylinder.

According to a yet further aspect of the present invention, there is provided a method of controlling a hydraulic press of the type wherein, when at least one of a pair of metal mold halves is moved by a hydraulic cylinder to compression mold a work of resin material within a cavity defined between the metal mold halves, the velocity of movement of the metal mold half by the hydraulic cylinder is controlled until pressurization of the work is started, but after starting of the pressurization, the pressurizing force of the hydraulic cylinder is controlled, wherein, in deceleration control of velocity control before changing over from the velocity control to pressure control, the velocity V of movement of the hydraulic cylinder is controlled in accordance with an expression $$V = (Z_1 - Z_2)\frac{1}{\alpha} e^{-\frac{1}{\alpha}t}$$

where $Z_1$ is a stroke position of the hydraulic cylinder at a point of time when the deceleration control is started, $Z_2$ another stroke position of the hydraulic cylinder upon changing over from the velocity control to the pressure control, $\alpha$ a time constant, e a base of natural logarithm, and t an interval of time after starting of the deceleration control.

With the controlling method, velocity control of the hydraulic cylinder is effected in accordance with an exponential function. Accordingly, deceleration can be made smoothly and a uniform material flow can be attained. Further, optimum deceleration patterns for various resin materials can be obtained by suitably changing the time constant or the position at which deceleration is to be started. Consequently, pressure control after then can be maintained in optimal molding conditions.

According to a yet further aspect of the present invention, there is provided a method of controlling a hydraulic press of the type wherein, when at least one of a pair of metal mold halves is moved by a hydraulic cylinder to compression mold a work of resin material within a cavity defined between the metal mold halves, the velocity of movement of the metal mold half by the hydraulic cylinder is controlled until pressurization of the work is started, but after starting of the pressurization, the pressurizing force of the hydraulic cylinder is controlled, wherein the pressure control proceeds such that the pressure P of the hydraulic cylinder is maintained at a fixed value $P_0$ for a fixed interval of time $T_0$ after starting of the pressure control, and after then, the pressure P is controlled in accordance with an expression $$P = P_1 + (P_0 - P_1) e^{-\frac{1}{\beta}t}$$

where $P_1$ is a pressure of the hydraulic cylinder upon completion of the compression molding, $\beta$ a time constant, e a base of natural logarithm, and t an interval of time after lapse of a fixed interval of time $T_0$.

With the controlling method, the pressurizing force is controlled in an exponential function, and the control based on an exponential function conforms well to an actual behavior of an internal pressure of the mold. Thus, the pressurizing force is controlled in conformity with a variation in condition of expansion, shrinkage and cure which takes place during molding of resin material. Accordingly, any resin material can be pressurized in an optimal condition, and consequently, molded articles of a high quality can be attained.

According to an additional aspect of the present invention, there is provided a control device for a hydraulic press for controlling a hydraulic cylinder of the hydraulic press wherein a slide is moved by the hydraulic cylinder to compression mold a work, which comprises a pressure controlling valve interposed in a hydraulic circuit of the hydraulic cylinder, and a controlling means for controlling a preset pressure of the pressure controlling valve at a plurality of stages in accordance with a variation in condition of a work.

With the control device, a change in condition of a work is transmitted to the controlling means, and the controlling means thus controls the preset pressure of the pressure controlling valve in accordance with the change in condition of the work. Accordingly, an optimum pressurizing force can be applied to the work, and consequently, molded articles of a high quality can be produced on the hydraulic press.

The above and other objects, features and advantages of the present invention will become apparent from the following description and the appended claims, taken in conjunction with the accompanying drawings.

BRIEF DESCRIPTION OF THE DRAWINGS

FIG. 5 is a flow diagram illustrating different stages of operation of the hydraulic press of FIG. 2;

DETAILED DESCRIPTION OF THE PREFERRED EMBODIMENTS

Figure 2:
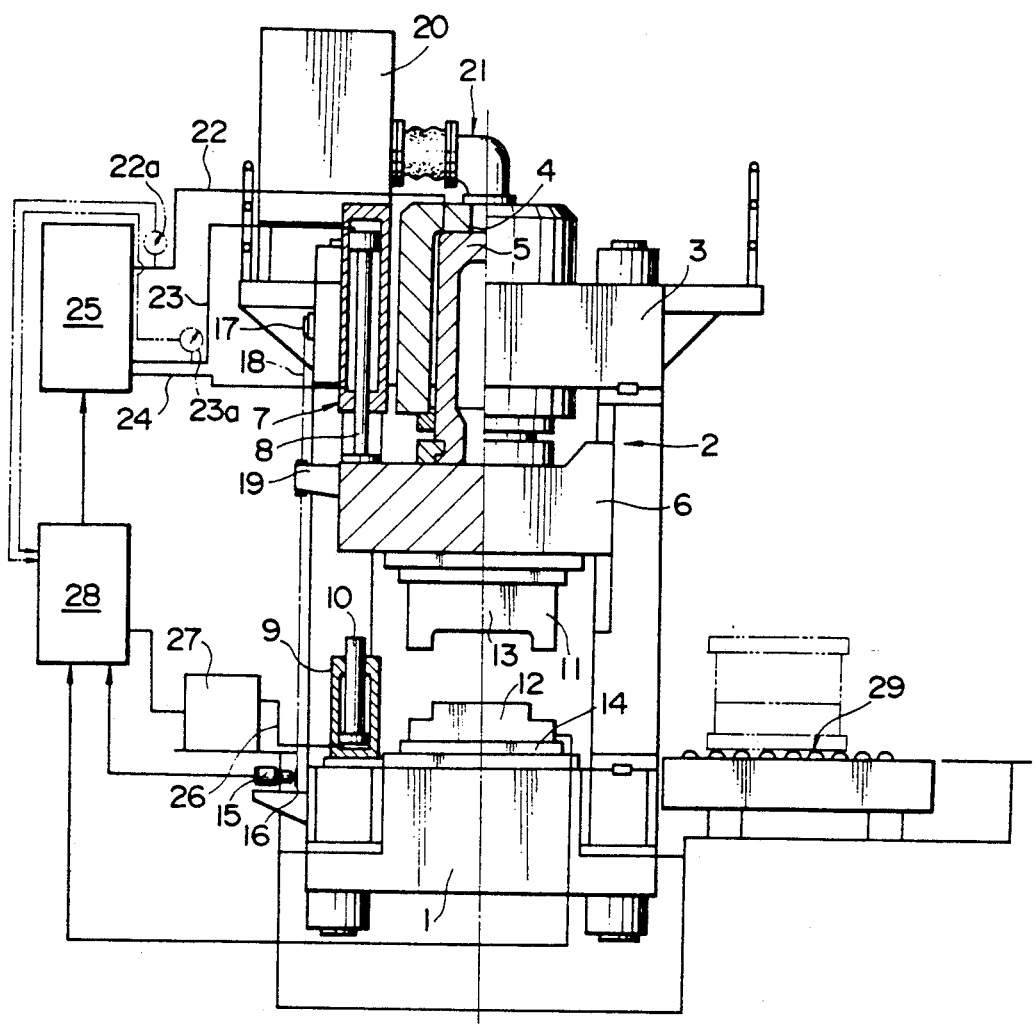
FIG. 2 ia a partial vertical sectional view of a hydraulic press to which the present invention is applied.

Referring first to FIG. 2, there is shown a hydraulic press for an SMC material. The hydraulic press shown includes a bed 1 secured to a floor, an upright 2 provided uprightly at each of four corners of the bed 1, and a crown 3 securely connected to upper end portions of the uprights 2. A main cylinder 4 of the single action type is mounted at a central location of the crown 3 and includes a piston rod 5 which extends downwardly through and below the crown 3, and a slide 6 is connected to a lower end of the piston rod 5. The slide 6 is supported for up and down movement under the guidance of the four uprights 2. A pair of sub-cylinders 7 of the double action type are provided on the left and right opposite sides of the crown 3 and each includes a piston rod 8 connected to the slide 6.

A leveling cylinder 9 is provided at each of the four corners of the bed 1 and includes a piston rod 10 having an upper end face located for engagement with a lower face of the slide 6.

An upper metal mold half 11 is removably mounted on a lower face of the slide 6 while a lower metal mold half 12 is removably mounted on an upper face of the bed 1.

The upper and lower metal mold halves 11 and 12 are designed such that a cavity 13 may be defined between them when they are in a mutually closed position. A mold pressure sensor 14 for detecting an internal pressure of the cavity 13 is installed in the lower metal mold half 12.

A rotary encoder 15 is mounted on a side face of the bed 1, and a sprocket wheel 16 is mounted on an input shaft of the rotary encoder 15. A chain 18 extends between and around the sprocket wheel 16 and another sprocket wheel 17 which is mounted for rotation on a side face of the crown 3. The opposite ends of the chain 18 are secured to a bracket 19 mounted on the slide 6. The rotary encoder 15 is thus provided to detect a position and a velocity of movement of the slide 6.

An oil tank 20 is placed on the crown 3 and hydraulically connected to the main cylinder 4 via a full oil valve 21. The main cylinder 4 is further connected to a pressurizing hydraulic unit 25 for the pressurizing cylinders 4 and 7 by way of hydraulic pipes 22, 23 and 24. Meanwhile, the leveling cylinders 9 are connected to a leveling hydraulic unit 27 by way of a hydraulic pipe 26.

The pressurizing hydraulic unit 25, the leveling hydraulic unit 27, the mold pressure sensor 14, and the rotary encoder 15 are electrically connected to a controlling means 28.

A table 29 for carrying a metal mold into and out of the hydraulic press is provided adjacent the hydraulic press.

Figure 3:
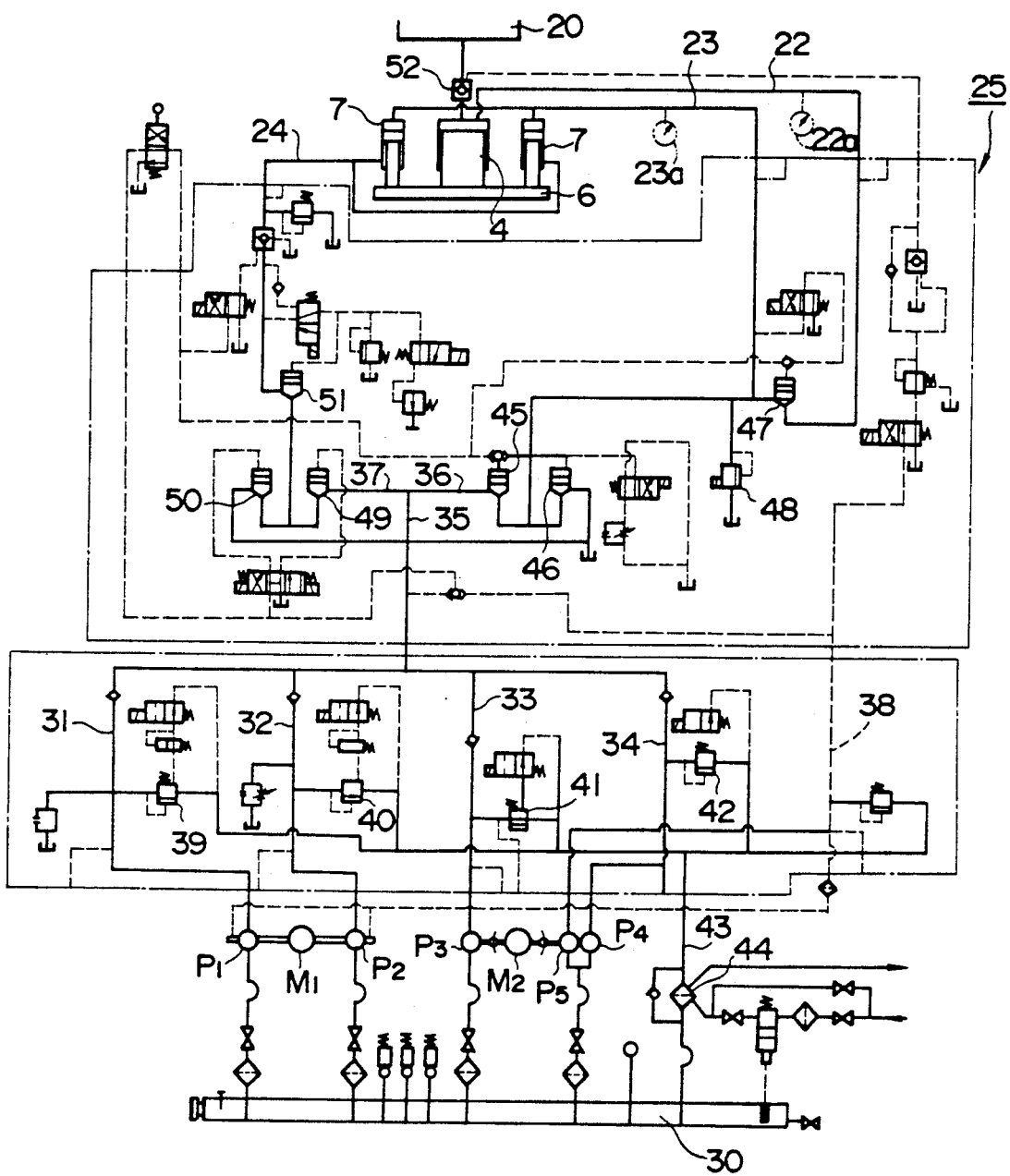
FIG. 3 is a circuit diagram of a hydraulic circuit for a main cylinder of the hydraulic press shown in FIG. 2.

Referring now to FIG. 3, there is shown a hydraulic circuit for the pressurizing hydraulic unit 25. The hydraulic circuit shown includes an oil tank 30, and first and second hydraulic pump driving electric motors $M_1$ and $M_2$. The first motor $M_1$ is connected to drive first and second velocity controlling servo pumps $P_1$ and $P_2$, while the second motor $M_2$ is connected to drive third and fourth hydraulic pumps $P_3$ and $P_4$ and a servoing hydraulic pump $P_5$.

Delivery ports of the first to fourth pumps $P_1$ to $P_4$ are connected to first to fourth hydraulic oil lines 31, 32, 33 and 34, respectively. The first to fourth hydraulic oil lines 31, 32, 33 and 34 are joined to a fifth hydraulic oil line 35 which branches into sixth and seventh hydraulic oil lines 36 and 37. The sixth hydraulic oil line 36 branches into the hydraulic pipe 22 connected to the main cylinder 4 and the hydraulic pipe 23 connected to the head sides of the sub-cylinders 7. The seventh hydraulic oil line 37 is connected to the hydraulic pipe 24 connected to the rod sides of the sub-cylinders 7. A pilot hydraulic pipe 38 is connected to the delivery port of the servoing hydraulic pump $P_5$ and shown in a broken line in FIG. 3.

Relief valves 39, 40, 41 and 42 for remote operation are interposed in the first to fourth hydraulic oil lines 31, 32, 33 and 34, respectively, and connected commonly to a drain line 43. A cooler 44 is interposed in the drain line 43.

First to third on-off valves 45, 46 and 47 are interposed in the sixth hydraulic oil line 36. The first on-off valve 45 is provided to control the sixth hydraulic oil line 36 to be opened or closed. The second on-off valve 46 is provided to control the sixth hydraulic oil line 36 to be opened to the oil tank 30. The third on-off valve 47 is provided to control the hydraulic pipe 22 for the main cylinder 4 to be opened or closed. The first to third on-off valves 45, 46 and 47 are operated by pressure oil of the pilot hydraulic pipe 38 in response to an instruction from the controlling means 28.

A pressure controlling valve 48 is interposed in the sixth hydraulic oil line 36 between the first on-off valve 45 and the third on-off valve 47. The pressure controlling valve 48 is provided to control the pressure in the hydraulic oil line 36 continuously or stepwise in response to an instruction from the controlling means 28.

Fourth to sixth on-off valves 49, 50 and 51 are interposed in the seventh hydraulic oil line 37. Those on-off valves 49, 50 and 51 are also operated to open or close in response to an instruction from the controlling means 28.

A check valve 52 is installed in the full oil valve 21 and operated to open or close by pressure oil of the pilot hydraulic pipe 38 in response to an instruction from the controlling means 28.

Figure 4:
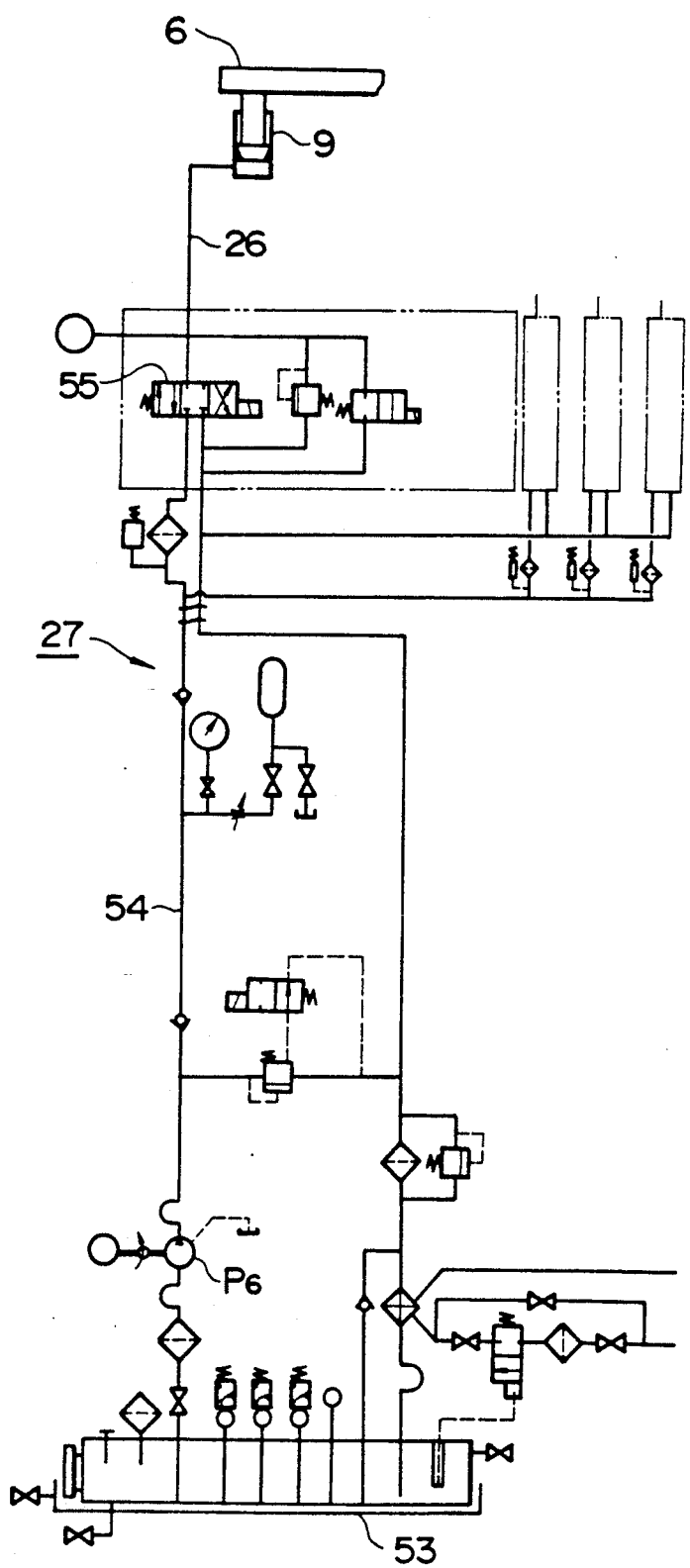
FIG. 4 is a circuit diagram of a hydraulic circuit for a leveling cylinder of the hydraulic press shown in FIG. 2.

Referring now to FIG. 4, there is shown a hydraulic circuit for the leveling hydraulic unit 27. The hydraulic circuit shown includes an oil tank 53 from which hydraulic oil is supplied by way of a hydraulic pump $P_6$ and an eighth hydraulic oil line 54 to the hydraulic pipe 26 connected to the leveling cylinders 9. Four servo valves 55 are interposed in the eighth hydraulic oil line 54 and connected to be operated in response to an instruction from the controlling means 28. The four servo valves 55 are provided corresponding to the leveling cylinders 9.

Figure 1:
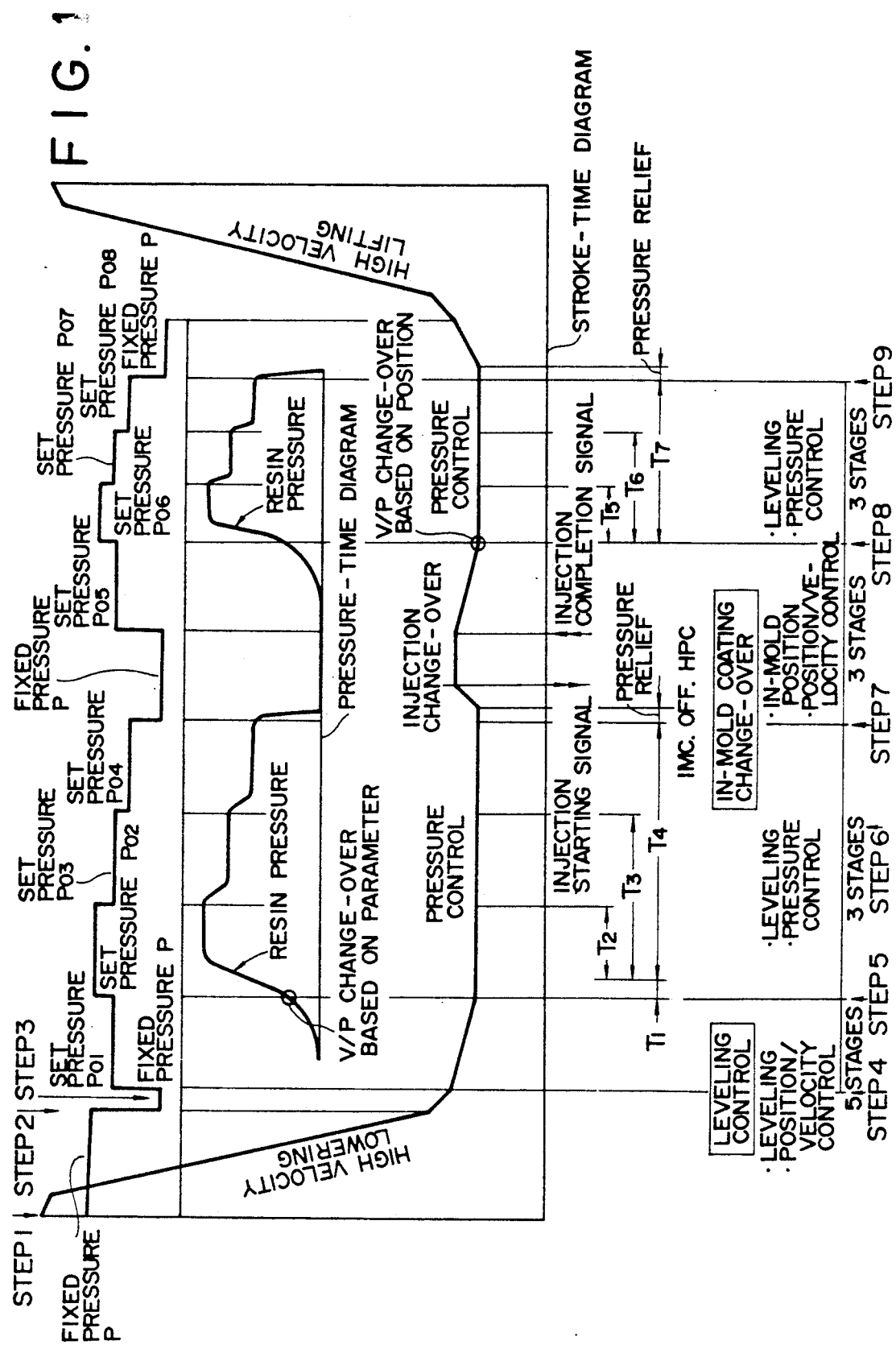
FIG. 1 is an operational diagram illustrating a method of controlling a hydraulic press according to the present invention.

FIG. 5 illustrates a flow of operations of the hydraulic press described above, and FIG. 1 is an operational diagram of the same. Referring to FIGS. 1 and 5, STEP 1 illustrates the hydraulic press at a starting point of time at which the slide 6 is positioned at its top dead center. In the position of the hydraulic press shown, SMC material 56 is filled into the cavity 13 of the lower metal mold half 12.

Subsequently, STEP 2 shows the hydraulic press in a condition wherein the slide 6 is being moved down at a high velocity. Thereupon, hydraulic oil from the first to fourth pumps $P_1$, $P_2$, $P_3$ and $P_4$ shown in the hydraulic circuit diagram of FIG. 3 is supplied to the main cylinder 4 and the sub-cylinders 7 by way of the first to fourth hydraulic oil lines 31, 32, 33 and 34 and the fifth hydraulic oil line 35 and then by way of the sixth hydraulic oil line 36 and the hydraulic pipes 22 and 23 for the main cylinder 4 and the sub-cylinders 7, respectively. In this instance, the first, third, fifth and sixth on-off valves 45, 47, 50 and 51 are open, while the second and fourth on-off valves 46 and 49 are closed. Hydraulic oil on the rod sides of the sub-cylinders 7 is thus returned to the tank 30 by way of the fifth on-off valve 50.

STEP 3 illustrates the slide 6 moving down at an intermediate velocity. In this instance, the delivery amounts of the velocity controlling servo pumps $P_1$ and $P_2$ are controlled by the controlling means 28 to move down the slide 6 at an intermediate velocity. Changing over from STEP 2 to STEP 3 is effected in response to detection of a specific position of the slide 6 by the rotary encoder 15.

At subsequent STEP 4, velocity control and leveling control are effected in a simultaneous relationship. In particular, changing over from STEP 3 to STEP 4 is effected in response to detection of another specific position of the slide 6 by the rotary encoder 15 such that the lower face of the slide 6 may be contacted softly with the top end faces of the piston rods 10 of the leveling cylinders 9. After then, the slide 6 is moved down while pressing against the piston rods 10 of the leveling cylinders 9. In this instance, the servo valves 55 are controlled individually so that the leveling cylinders 9 may be positioned at a same level in order to attain a horizontal position of the slide 6 with a high degree of accuracy.

At STEP 4, the velocity controlling servo pumps $P_1$ and $P_2$ are controlled so as to move down the slide 6 at a plurality of stages. At the end of STEP 4, mold closing of the upper and lower metal mold halves 11 and 12 is completed, and the SMC material 56 fills up the cavity 13.

Figure 15:
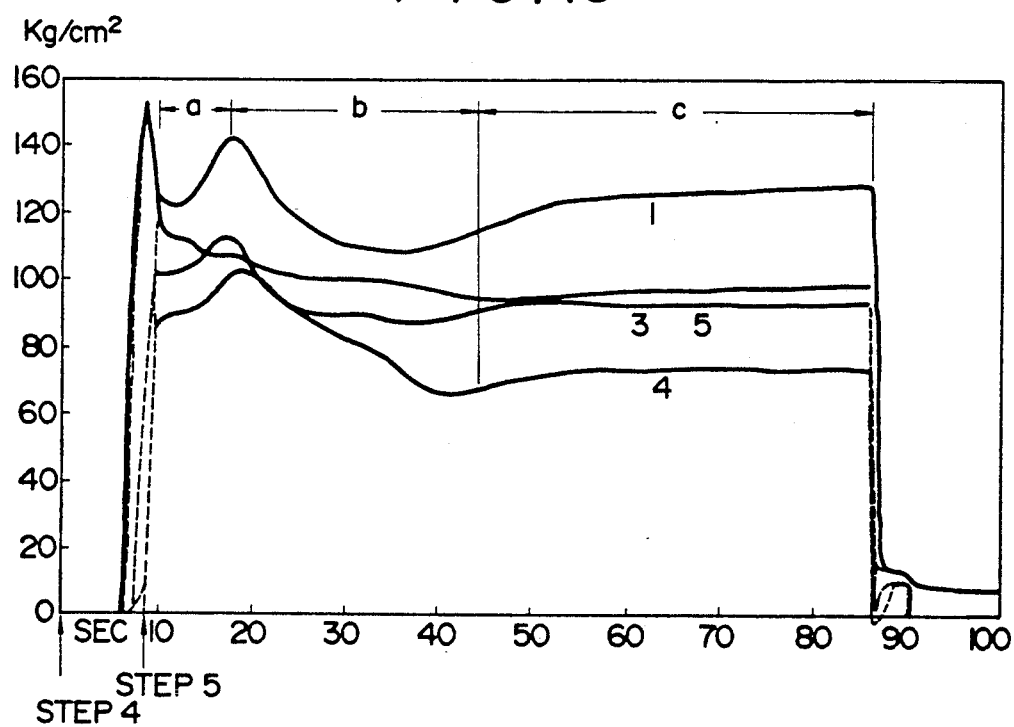
FIG. 15 is a pressure-time diagram illustrating internal pressures of a metal mold.
Figure 16:
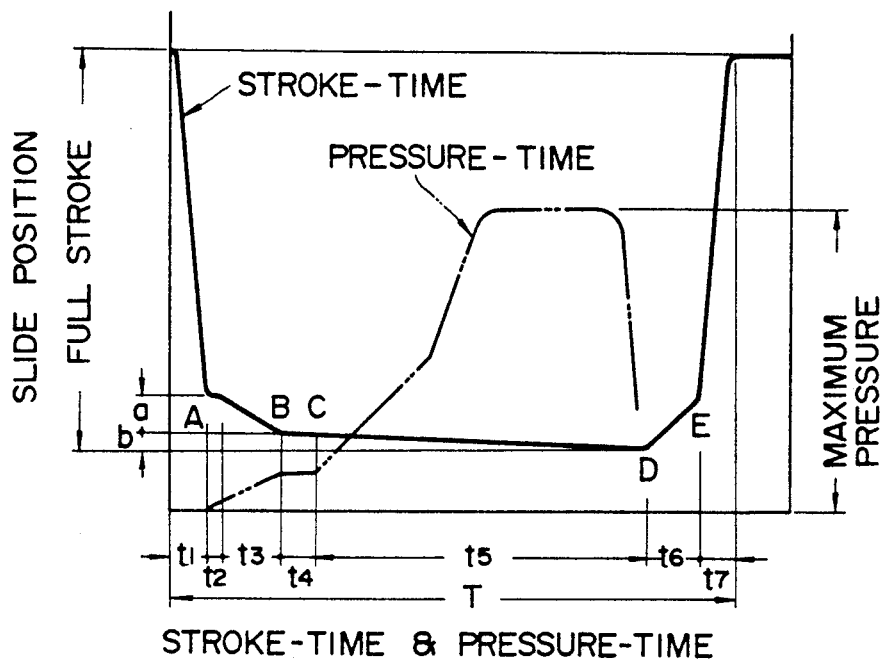
FIG. 16 is a stroke-time and pressure - time diagram illustrating a conventional method of controlling a hydraulic press.
Figure 17:
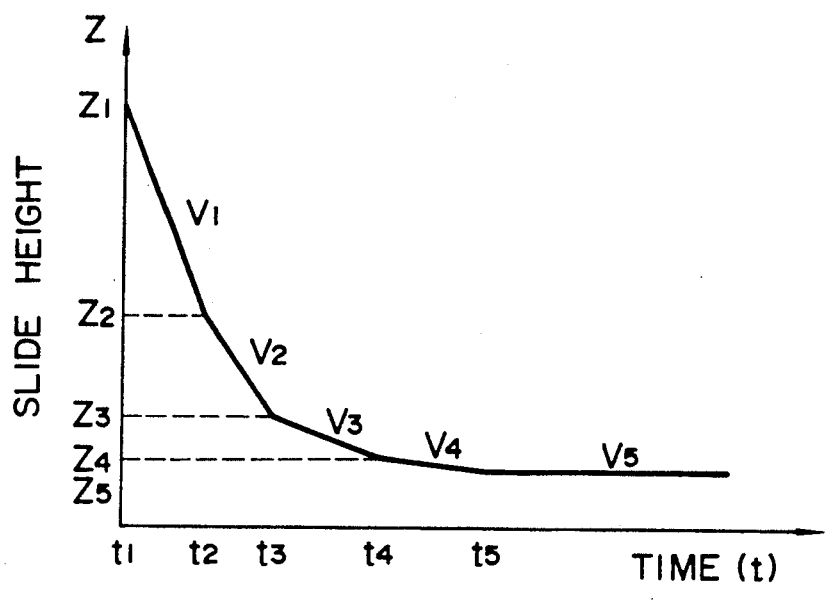
FIG. 17 is a stroke-time diagram illustrating a conventional multi-stage deceleration control.
Figure 18:
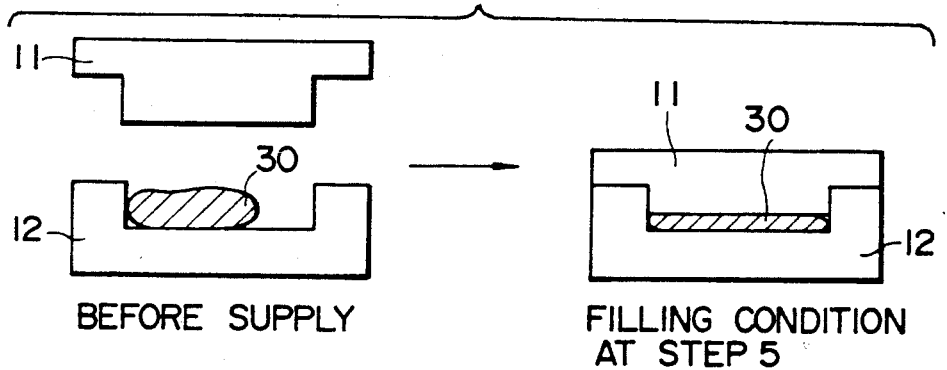
FIGS. 18 and 19 are schematic sectional views showing different conditions of resin material put in a metal mold.
Figure 19:
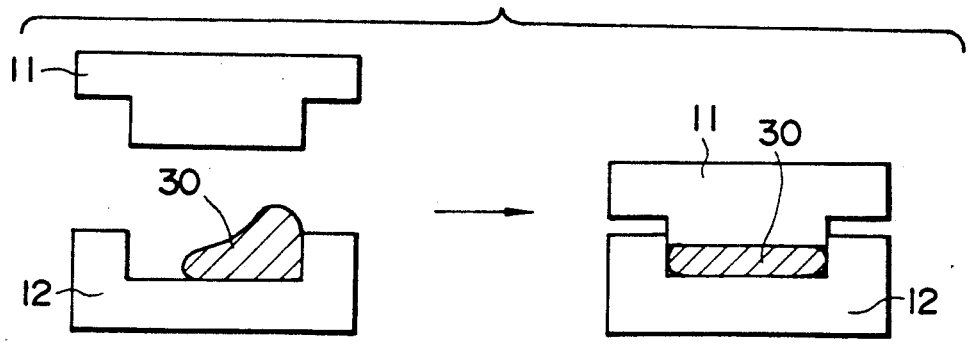

As the SMC material 56 fills up the cavity 13, the internal pressure of the cavity 13 exhibits its peak value as seen in FIG. 15. The internal pressure is successively or continuously detected by the mold pressure sensor 14. In response to such a detection value, or more particularly when such a detection value coincides with a preset value set in advance in the controlling means 28, control of movement of the slide 6 or upper metal mold half 11 is changed over from the velocity control to subsequent pressure control. Such changing over of control is illustrated at STEP 5.

Such changing over of control can naturally depend on detection of any other parameter of the hydraulic press which varies as the velocity control proceeds. The parameter may be a position of the slide 6 or upper metal mold half 11. In such an instance, the position at which the internal pressure of the cavity 13 exhibits its peak value is found out in advance through experiments, and the position is set in advance in the controlling means 28. Thus, at a point of time when a position detected by the rotary encoder 15 coincides with the preset value, control of movement of the slide 6 is changed over from the velocity control to pressure control.

Figure 6A:
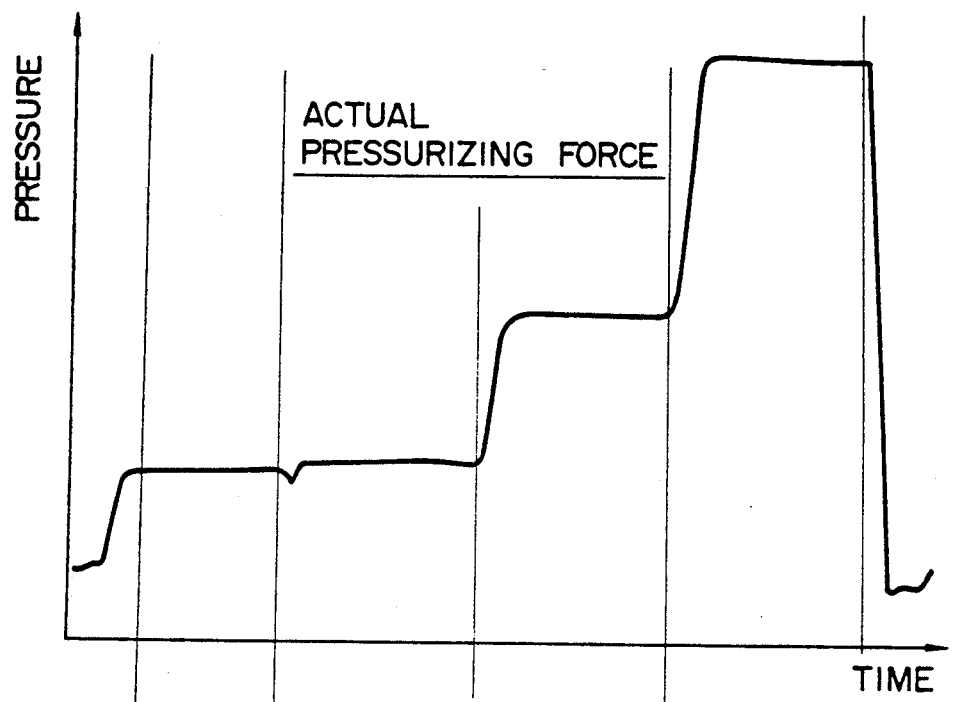
FIGS. 6A and B are graphs illustrating a variation in internal pressure of the main cylinder shown in FIG. 2.
Figure 6B:
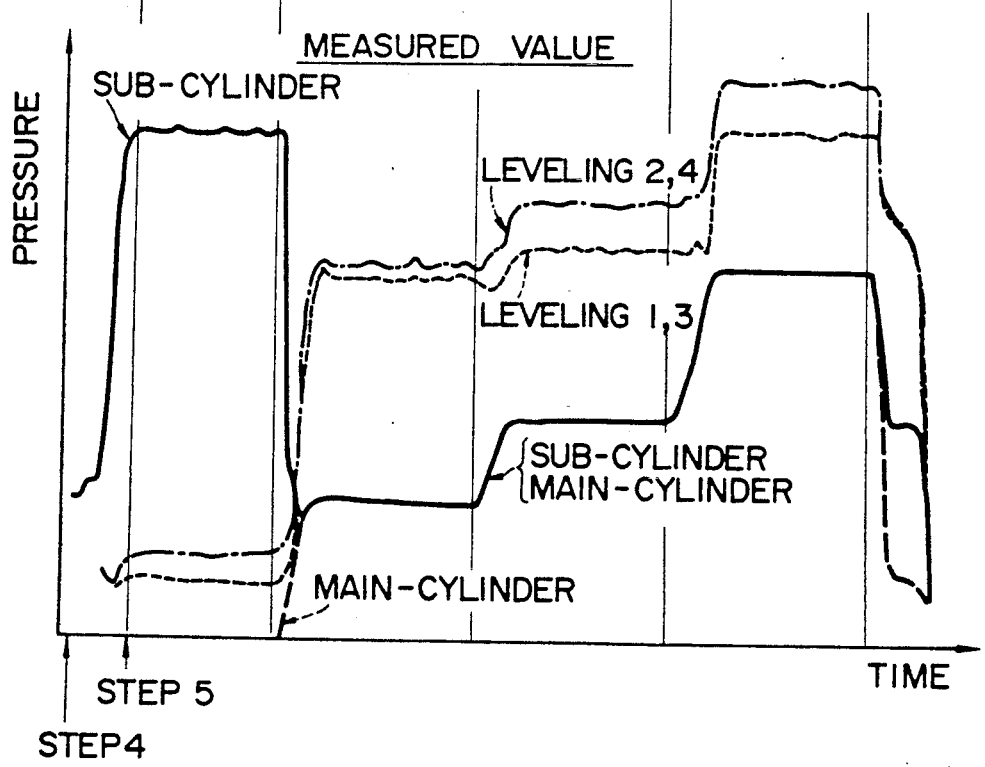

The parameter may otherwise be a pressure of hydraulic oil within the main cylinder 4 or any of the sub-cylinders 7 because the pressure exhibits its peak value when the internal pressure of the cavity 13 exhibits its peak value. In this instance, a pair of pressure detecting means 22a and 23a may be interposed in the hydraulic pipes 22 and 23, respectively, and connected to the controlling means 28 as shown in phantom in FIGS. 2 and 3. Thus, as SMC material 56 is filled up in the cavity 13, the internal pressures of the main cylinder 4 and the sub-cylinders 7 exhibit their peak values as seen in FIGS. 6A and B and at a point of time when a pressure detected by the pressure detecting means 22a or 23a coincides with a preset value set in advance in the controlling means 28, control of movement of the slide 6 is changed over from the velocity control to pressure control.

The velocity of downward movement of the upper metal mold half 11 or slide 6 may also be adopted as the parameter. In particular, as the SMC material 56 is filled up in the cavity 13, the velocity of downward movement of the upper metal mold half 11 or slide 6 is gradually reduced to zero or a value near zero as seen in the stroke-time diagram of FIG. 1, while the internal pressure of the cavity 13 approaches its peak value. Thus, the velocity of downward movement of the upper metal mold half 11 or slide 6 is successively detected by means of the rotary encoder 11, and when the detected velocity value coincides with a preset value, changing over from the velocity control to pressure control is effected.

STEP 6 illustrates the hydraulic press in which pressure control and leveling control are effected in a simultaneous relationship.

In particular, the pressure of the hydraulic circuit is controlled by the pressure controlling valve 48 while the delivery amounts from the hydraulic pumps are held fixed.

In the pressure control, a change in condition of the SMC material 56 within the cavity 13 is detected by the mold pressure sensor 14, and the pressurizing force is controlled at a plurality of stages (including continuous control) in response to the change in condition. Such a controlling instruction is developed from the controlling means 28.

Such multi-stage pressure control can be achieved otherwise, where a change in condition of the SMC material 56 within the cavity 13 in accordance with passage of time is known in advance, by controlling the pressurizing force stepwise to a selected one of preset values after each lapse of a predetermined interval of time.

In the pressure control, the leveling cylinders 9 are controlled in response to a change in pressure in the main cylinder 4 or the sub-cylinders 7 so as to maintain the slide 6 in a horizontal position.

After completion of the compression molding, the slide 6 is moved up a little by way of a pressure relieving step in order to effect in-mold coating. The step is shown at STEP 7. At STEP 7, velocity control is effected by the servo valves 55. For such upward movement of the slide 6, the second, third and fifth on-off valves 46, 47 and 50 are closed while the first, fourth and sixth on-off valves 45, 49 and 51 are opened. Hydraulic oil is thus supplied to the cylinder sides and the rod sides of the sub-cylinders 7 by way of the fifth hydraulic oil line 35 and the sixth and seventh hydraulic oil lines 36 and 37 so that the sub-cylinders 7 are brought into a free condition. Oil in the main cylinder 4 is thus enabled to flow into the oil tank 20 via the fuel oil valve 21 as the check valve 52 is operated by the pilot pressure.

The leveling cylinders 9 are thus moved up by means of the servo valves 55 thereof and thus move up the slide 6.

Also upon such upward movement of the slide 6, the leveling cylinders 9 are controlled so as to maintain a horizontal position of the slide 6.

A velocity of upward movement and a position of the slide 6 are detected by the rotary encoder 15 and fed back for the velocity control.

After completion of the in-mold coating, the slide 6 is moved down again, and when a predetermined position is reached, control of movement of the slide 6 is changed over from velocity control to pressure control. The step is shown at STEP 8.

At STEP 8, multi-stage pressure control is effected in a similar manner as at STEP 6 described above, thereby completing the compression molding including the in-mold coating. Then, pressure relief is effected, and then, the slide 6 is moved up back to its original top dead center. The upward movement is illustrated at STEP 9 to STEP 12, and after STEP 9, velocity control is effected. For upward movement of the slide 6 at and after STEP 9, the first, third and fifth on-off valves 45, 47 and 50 are closed while the second, fourth and sixth on-off valves 46, 49 and 51 are opened. Thus, hydraulic oil is supplied to the rod sides of the sub-cylinders 7 by way of the fifth hydraulic oil line 35 and the seventh hydraulic oil line 37. Oil on the rod sides of the sub-cylinders 7 is returned to the tank 30 via the second on-off valve 46 of the sixth hydraulic oil line 36, while oil in the main cylinder 4 is returned to the oil tank 20 via the fuel oil valve 21 as the check valve 52 is operated by the pilot pressure.

All of the steps of the hydraulic press are thus completed.

Figure 7:
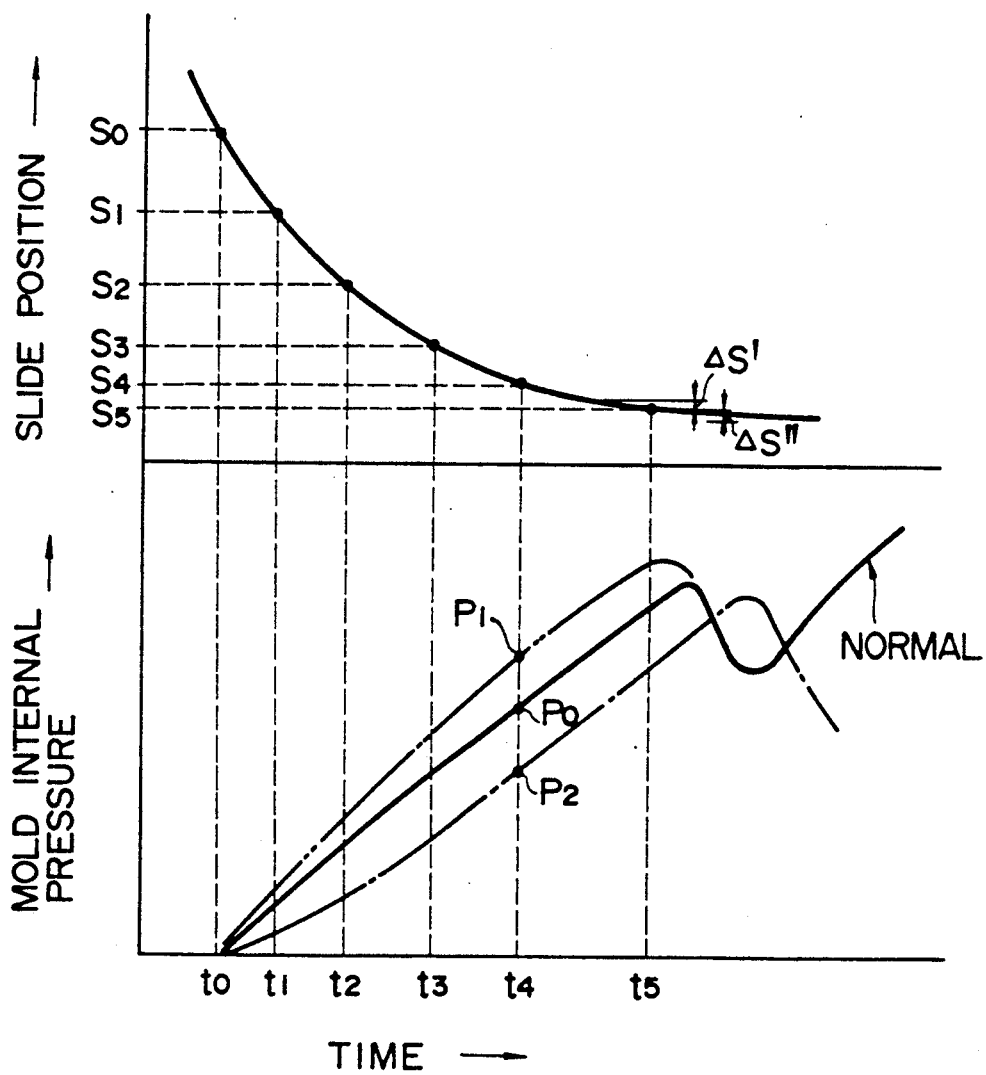
FIG. 7 is a graph showing a relationship between a stroke of a slide and an internal pressure of a metal mold.
Figure 8:
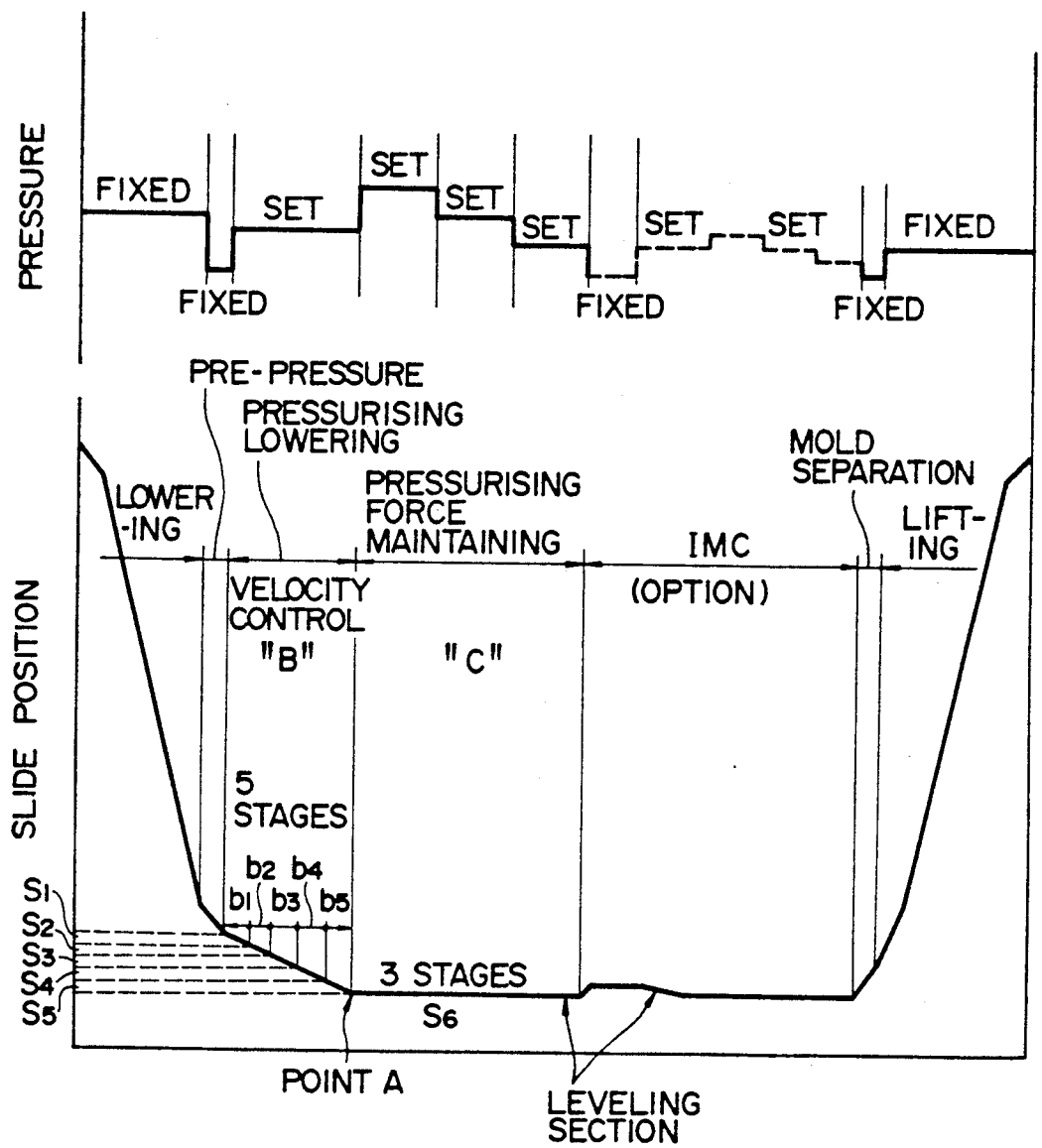
FIGS. 8A and B are operational diagrams illustrating a modification to the controlling method illustrated in FIG. 1.

The method of controlling a hydraulic press of the embodiment of the present invention described above can be modified so as to attain more accurate control of a hydraulic press to produce molded articles with a higher degree of accuracy on the hydraulic press. FIGS. 7 and 8 illustrate such a modification to the method of the embodiment described above.

Referring first to FIGS. 8A and B, according to the modified method, an internal pressure of the cavity 13 at a point of time before a point A of time at which control is to be changed over from velocity control to pressure control is detected by the mold pressure sensor 14 and compared with a preset pressure to correct the point A at STEP 5 so as to cause changing over from velocity control to pressure control to be effected at an optimum point of time in accordance with a condition of resin material.

FIG. 7 shows a relationship between a position of the slide 6 and an internal pressure of the cavity 13 in a velocity control region denoted at B in FIGS. 8A and B. Referring to FIG. 7, reference symbol $S_0$ denotes a point of time at which downward movement of the slide 6 for pressurization is started, $S_1$ a point at which the velocity of the pressurizing downward movement is changed over from a first velocity to a second velocity, $S_3$ to $S_4$ each denote a point at which the velocity is changed over similarly, and $S_5$ denotes a point at which control of the downward movement of the slide 6 is changed over from velocity control to pressure control. The point $S_5$ coincides with the point A shown at FIGS. 8A and B, and thus it is a point at which the SMC material 56 is filled up fully in the cavity 13.

Referring to FIG. 7, an internal pressure $P_0$ of the cavity 13 at the fixed point $S_4$ before changing over from velocity control to pressure control is set in advance. The preset pressure $P_0$ is a pressure at the point $S_4$ when the SMC material 56 is filled in an ideal condition. A difference $\Delta S_0 = S_5 - S_4$ in such an ideal condition is also set in advance.

Further, internal pressures P at the point $S_4$ in various extraordinary conditions and differences $\Delta S = S_5 - S_4$ then are also found out in advance through experiments or the like (in this instance, the point $S_4$ is a fixed point while the point $S_5$ is a variable point).

A difference $\Delta P$ between $P_0$ and P and the difference $\Delta S$ then are thus stored in the controlling means 28.

In actual operation of the hydraulic press, when the SMC material 56 is filled by an excessively large amount, if an internal pressure $P_1$ of the cavity 13 at the fixed point $S_4$ is detected, then $P_1 > P_0$, and a difference $\Delta P' = P_0 - P_1$ is calculated. Then, a value $\Delta S'$ corresponding to this $\Delta P'$ is found out, and at a position where the stroke of the slide 6 coincides with $S_5 = S_4 + \Delta S'$, control of the downward movement of the slide 6 is changed over from the velocity control to pressure control.

On the contrary, when the SMC material is filled by an excessively small amount, an internal pressure $P_2$ of the cavity 13 at the fixed point $S_4$ is $P_2 < P_0$, and thus, a difference $\Delta P'' = P_0 - P_2$ is calculated. Then, a value $\Delta S''$ corresponding to this $\Delta P''$ is found out, and at a position where the stroke of the slide 6 coincides with $S_5 = S_4 + \Delta S''$, control is changed over from the velocity control to pressure control.

According to the modified method, a fluctuation of a filling condition originating from a difference in manner in which SMC material is thrown into a metal mold is detected from an internal pressure of the metal mold in order to correct a point of time at which filling of material is to be completed. Consequently, changing over from velocity control to pressure control takes place accurately at a point of time at which material is fully filled up in the metal mold, which makes compression molding after then uniform.

Figure 9:
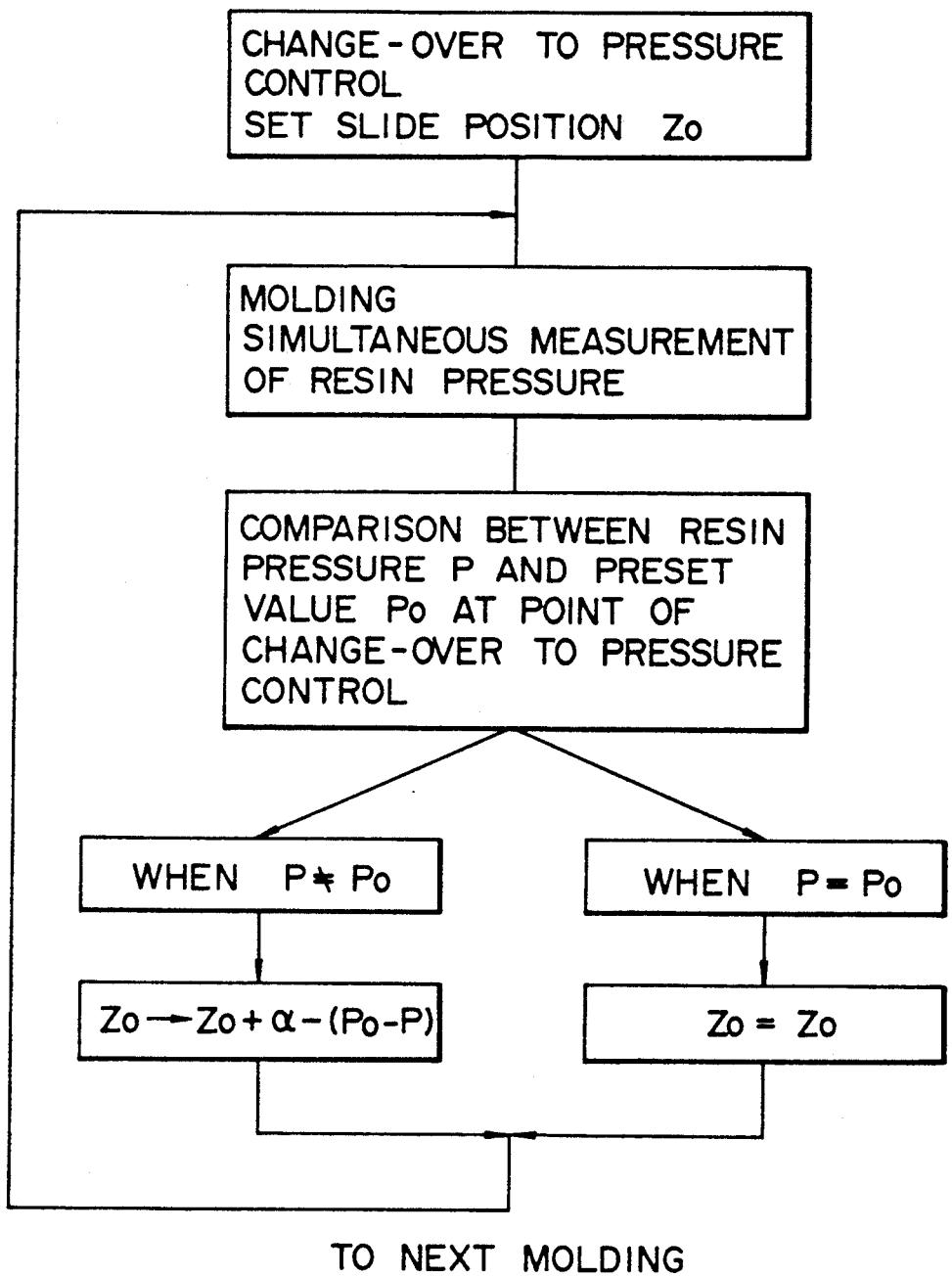
FIG. 9 is a flow chart illustrating a further modification to the controlling method illustrated in FIG. 1.
Figure 10:
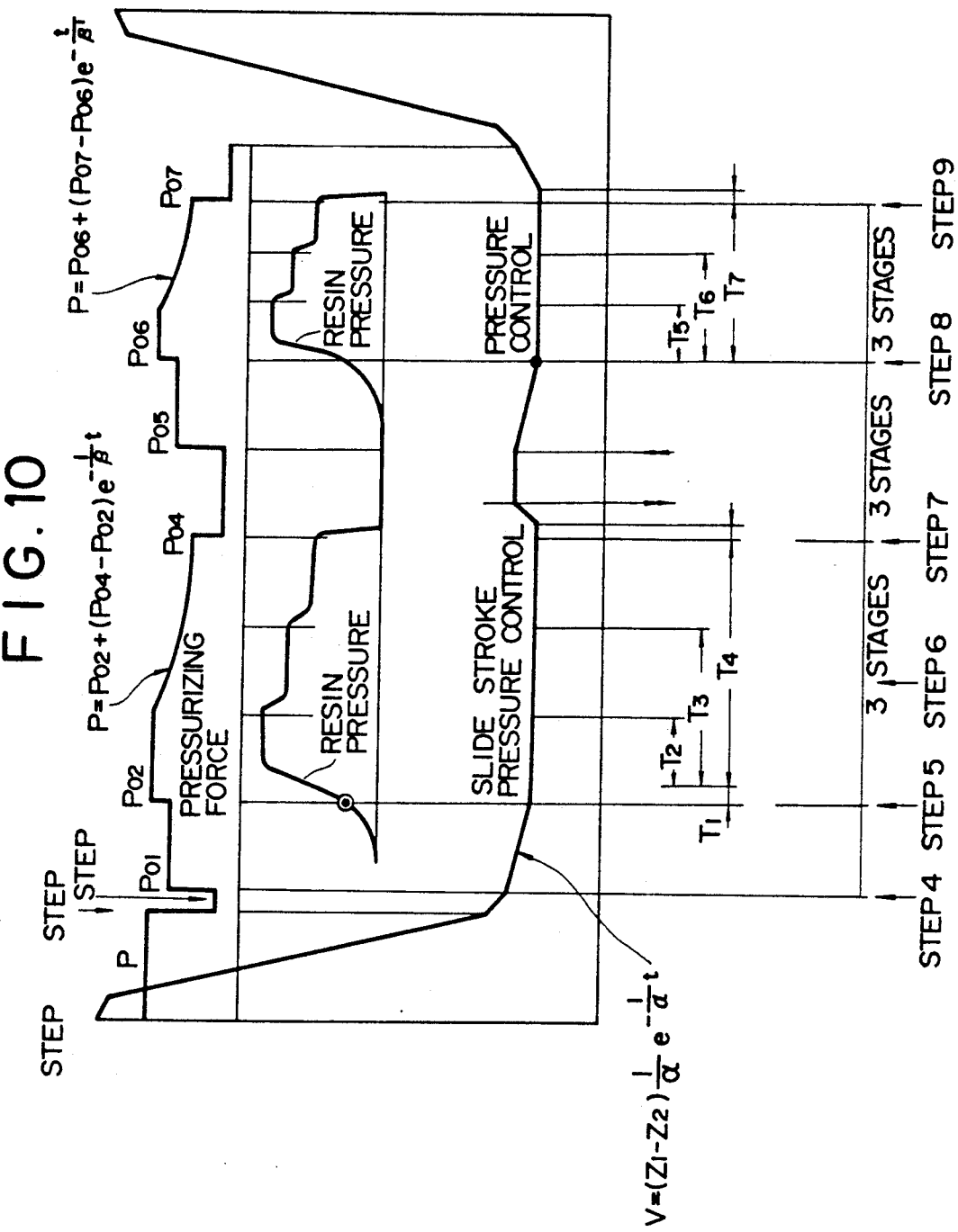
FIG. 10 is an operational diagram illustrating a still further modification to the method illustrated in FIG. 1.
Figure 11:
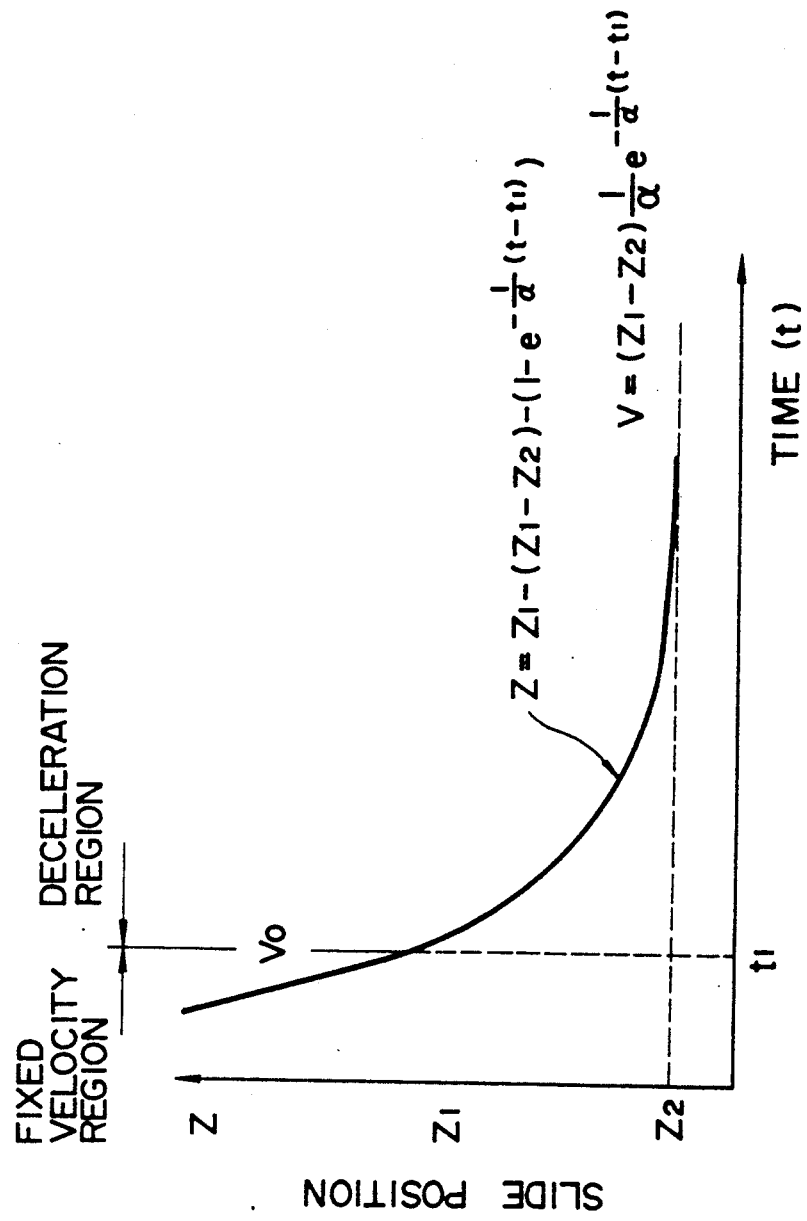
FIG. 11 is a graph illustrating a relationship between a position of the slide and a time in velocity control in the modified method illustrated in FIG. 10.

FIG. 9 illustrates another modification to the method of the embodiment described above. In the modified method illustrated in FIG. 9, a stroke position $Z_0$ of the slide 6 for changing over of control and an internal pressure $P_0$ of the cavity 13 then are set in advance. The preset values $Z_0$ and $P_0$ are values of a position of the slide 6 and an internal pressure of the cavity 13, respectively, when a predetermined amount of the SMC material 56 is filled until it is filled up fully in the cavity 13, and they are obtained in advance through experiments or the like.

Thus, at first in the first compression molding, control is changed over at STEP 5 when the slide 6 reaches the preset position $Z_0$. The timing of such changing over is determined a position of the slide 6 detected by way of the encoder 15. Simultaneously, an internal pressure P of the cavity 13 is detected by the mold pressure sensor 14. The detection value P is then compared with the preset internal pressure $P_0$.

In the case of $P = P_0$, it is determined that the internal pressure of the cavity 13 at the control changing over position $Z_0$ exhibits an appropriate value, and accordingly, the position of the slide 6 at which control is to be changed over at STEP 5 in a subsequent next compression molding cycle is left as the initially set value $Z_0$.

To the contrary, in the case of P≠P₀, it is determined that the internal pressure of the cavity 13 at the control changing over position $Z_0$ is either greater or smaller than an appropriate value, and accordingly, the position of the slide 6 at which control is to be changed over at STEP 5 in a subsequent next compression molding cycle must be corrected. The amount $\overline{V}Z$ for correction is calculated in accordance with an equation $\overline{V}Z = \alpha(P_0 - P)$. The coefficient $\alpha$ is determined through experiments or the like in advance. Thus, in a second compression molding cycle, the stroke position of the slide 6 at which control is to be changed over is changed from $Z_0$ to $Z_0 + \overline{V}Z$.

In any compression molding cycle after then, similar correction is repeated to find out an optimum position of the slide 6 at which control is to be changed over. The controlling means 28 has such a learning function of finding out an optimum position.

It is to be noted that where the stroke position at which control is to be changed over for the first time after starting of the hydraulic press is the preset position $Z_0$ itself, the correction amount $\overline{V}Z$ may appear with a positive sign (+) or a negative sign (−) and the number of times necessary for the correction amount $\overline{V}Z$ to converge to $\overline{V}Z \to 0$ may be too great. Thus, the stroke position for the first changing over of control is set to a value a little smaller than the preset value $Z_0$ so that the correction value $\overline{V}Z$ may converge to zero only from the positive (+) side in order to reduce the number of times required for correction.

On the other hand, when the detected value P of the internal pressure of the cavity 13 is greater than the preset value $P_0$, bad influence on products is considerably small comparing with that when the detected value P is smaller than the preset value $P_0$. Accordingly, for practical use, correction of a stroke position of the slide 6 may be effected only in the case of $P < P_0$.

While velocity control of the slide 6 is effected in a stepwise manner in any of the methods of the embodiment and the modifications to the embodiment described hereinabove, it may otherwise be effected partially or entirely in a continuous manner. FIGS. 10 to 14 illustrate such a modified method wherein velocity control includes exponential function control.

In particular, the controlling means 28 has the following initial preset values stored therein in advance:

$V_0$: velocity of movement of the hydraulic cylinder or cylinders or the slide before exponential function control is entered (fixed velocity at STEP 3)

$Z_1$: position of the slide at which deceleration is to be started (position at which changing over from STEP 3 to STEP 4 is to be effected)

$Z_2$: position of the slide at which pressure control is to be started (position at which changing over from STEP 4 to STEP 5 is to be effected)

$\alpha$: time constant $\overline{V}$: minimum controlling velocity of the velocity controlling pumps $P_1$ and $P_2$ Then, the position Z of the slide 6 is successively detected by way of the rotary encoder 15, and such a detected value Z of the position is compared with the deceleration starting position $Z_1$. In case the detected value Z is greater than the deceleration starting position $Z_1$, the slide 6 is controlled to move down at the fixed velocity $V_0$ by means of the velocity controlling pumps $P_1$ and $P_2$ (STEP 3).

To the contrary, in case the detected value Z is equal to or smaller than the deceleration starting position $Z_1$ ($Z \leq Z_1$), the slide 6 is controlled to decelerate in accordance with a deceleration pattern depending upon an exponential function and given by an expression $$V = (Z_1 - Z_2) \frac{1}{\alpha} e^{-\frac{1}{\alpha} t} \quad (1)$$

where
  e: base of natural logarithm
  t: time after decelerating starting point $t_1$ In this instance, if it is possible to control the amount of movement of the slide 6 by means of the velocity controlling pumps $P_1$ and $P_2$, then the movement of the slide 6 is controlled by the velocity controlling means $P_1$ and $P_2$. On the contrary, if the amount of movement of the slide 6 is too small, the remote operation relief valves 41 and 42 will be operated to effect control of a flow rate to the main cylinder 4 (in this instance, the flow rate of the velocity controlling pumps $P_1$ and $P_2$ is zero).

The time constant $\alpha$ may have a default value given by $$\alpha = \frac{Z_1 - Z_2}{V_0} \quad (2)$$

Where the time constant $\alpha$ is used, transition from the fixed velocity region (STEP 3) to the deceleration region (STEP 4) can proceed smoothly.

Figure 12:
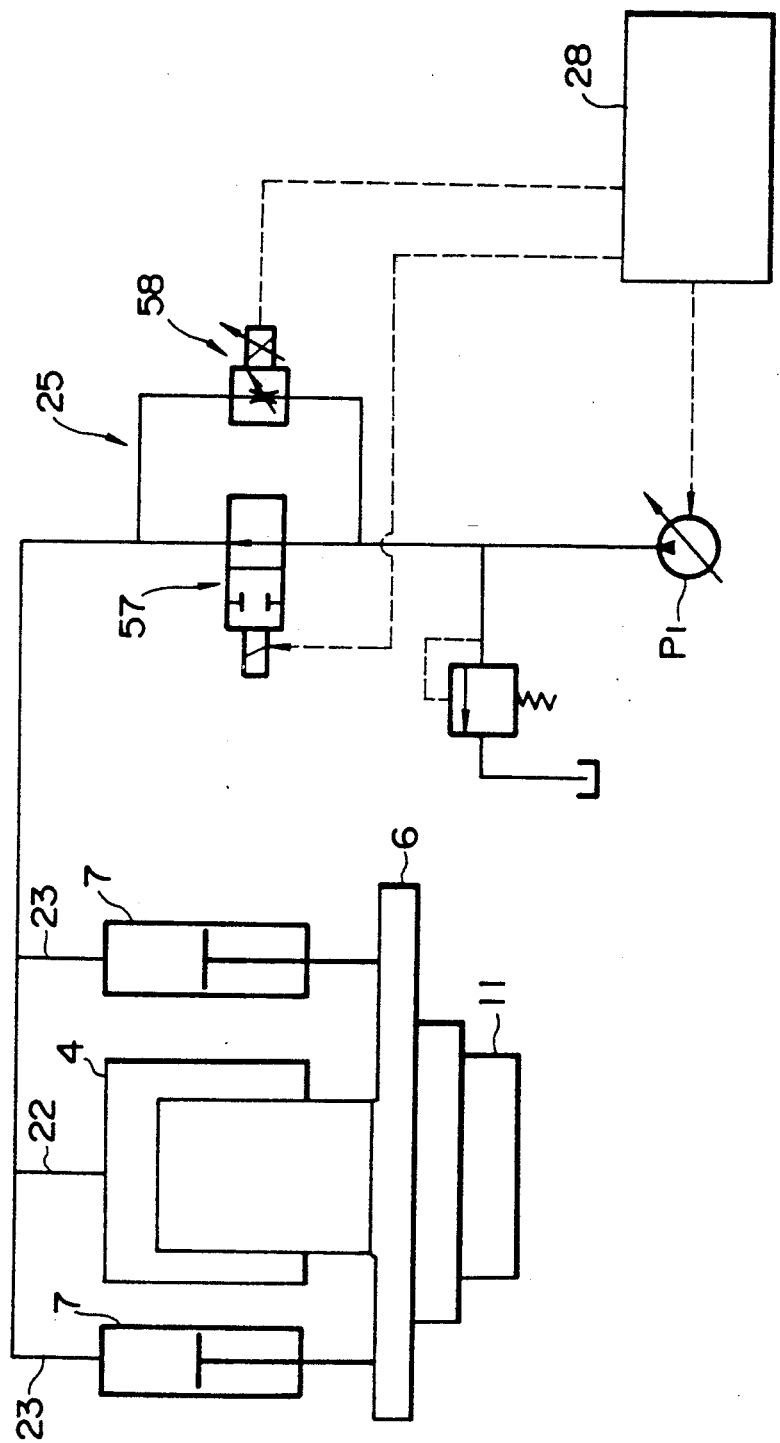
FIG. 12 is a circuit diagram showing a controlling circuit to which the method illustrated in FIG. 10 is applied.
Figure 13:
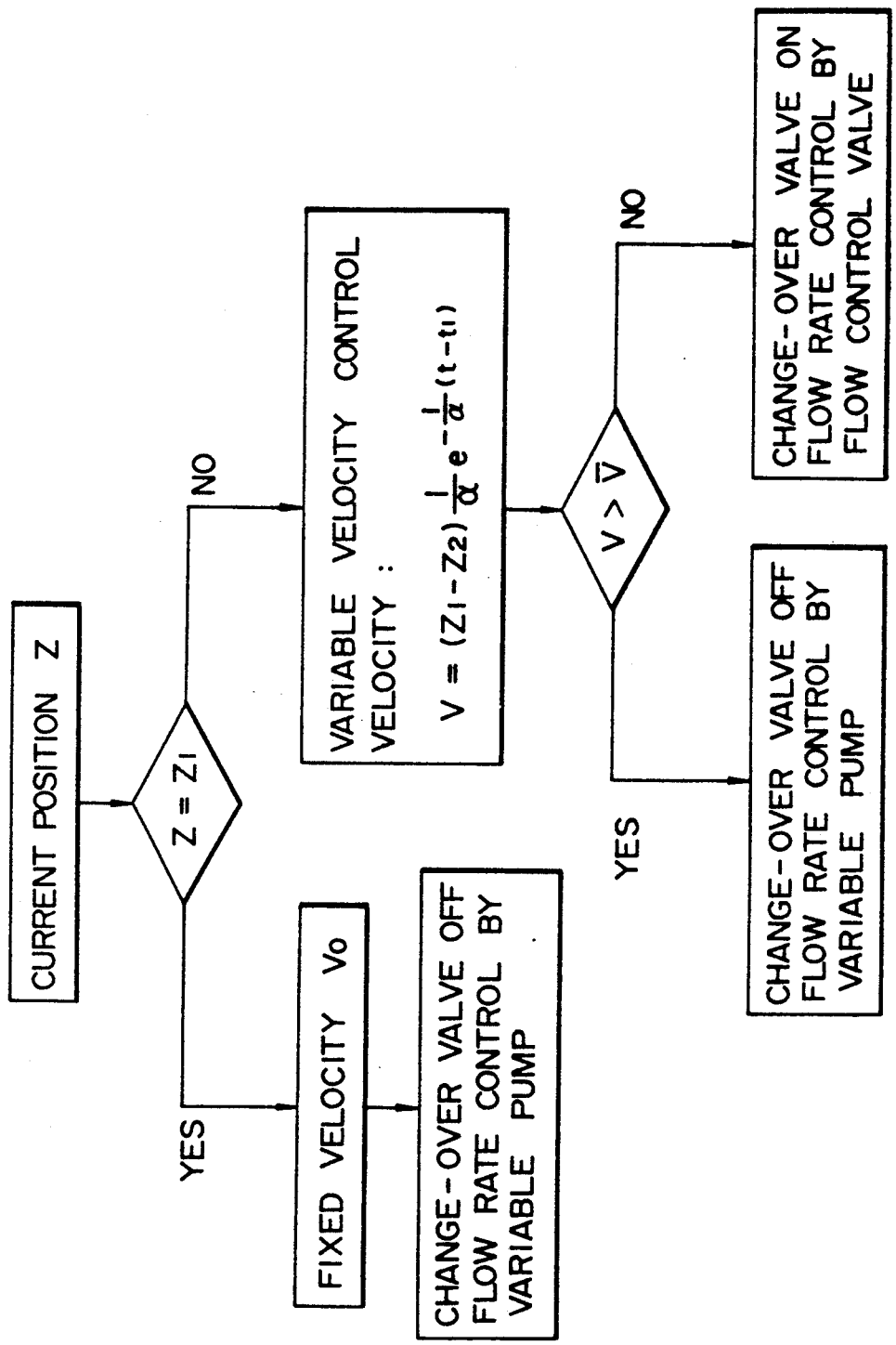
FIG. 13 is a flow chart illustrating operation of the controlling circuit shown in FIG. 12.
Figure 14:
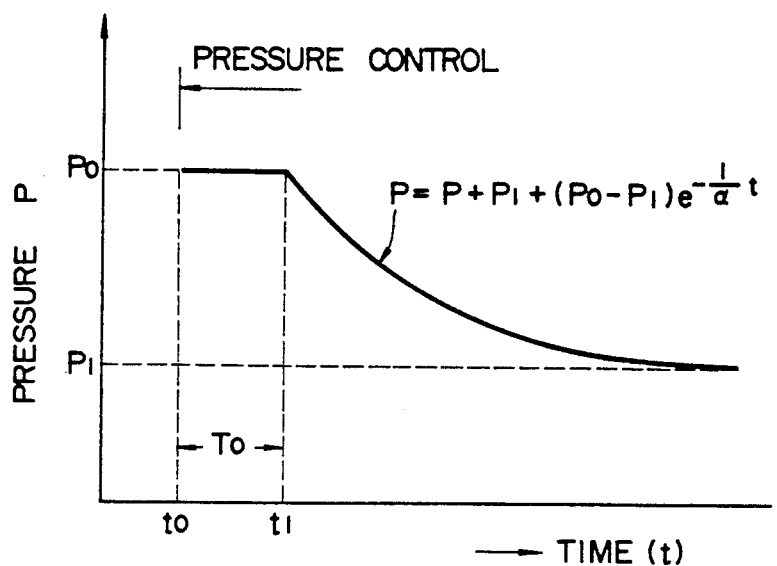
FIG. 14 is a graph illustrating a relationship between a pressure and a time in pressure control according to the method illustrated in FIG. 10.

FIG. 12 shows part of a controlling electric circuit where all of the hydraulic pumps included in the hydraulic circuit shown in FIG. 3 are variable pumps, and FIG. 13 shows operation of the controlling circuit shown in FIG. 12. Where the controlling circuit shown in FIG. 12 is employed, a change-over valve 57 and a flow controller 58 are interposed in parallel in the hydraulic circuit. Thus, in case the controlling flow rate of the main cylinder 4 can be controlled by the variable pumps, control is effected by means of the variable pumps. However, in case the controlling flow rate is too low, the change-over valve 57 is turned on, and the flow rate is controlled by means of the flow controller 58 so as to effect such exponential function control as described above.

Where such an exponential function is used for deceleration control, the slide 6 can be decelerated smoothly during pressurizing downward movement thereof (STEP 4), and consequently, a uniform material flow can be attained. Accordingly, pressure control at a next step can be effected under an optimum condition, and a molded article of a high quality can be produced. Further, if the deceleration position $Z_1$ and/or the time constant $\alpha$ are changed suitably, optimum molding conditions can be set for every kind of resin material.

Pressure control may also include exponential function control at STEP 6 and STEP 8. In particular, referring to FIG. 14, the internal pressure P of the cavity 13 is maintained for a predetermined fixed period of time $T_0$ after starting of pressure control (STEP 5), and after then, the internal pressure P is changed in accordance with an exponential function $$P = P_1 + (P_0 - P_1) e^{-\frac{1}{\beta}t} \quad (3)$$

where
P: internal pressure of the pressurizing cylinder 4 or 7
$P_0$: initial internal pressure
$P_1$: internal pressure upon completion of compression molding
$\beta$: time constant
t: time For such exponential function control as described above, an electric signal corresponding to the equation (3) above is transmitted from the controlling means 28 to the pressure controlling valve (electromagnetic proportional pressure controlling valve) 48 to control the hydraulic pressures of the pressurizing cylinders 4 and 7 to a preset value.

It is to be noted that the coefficients $P_0$, $P_1$ and $\beta$ in the equation (3) above depend on a resin material used.

The reason why the exponential function of the equation (3) is used in the pressure control is that a variation in internal pressure of the cavity 13 illustrated in FIG. 15 conforms to an exponential function.

Where pressure control is effected in accordance with an exponential function, a pressurizing force can be applied to resin material, which undergoes a change in condition of expansion, shrinkage and cure upon compression molding, in accordance with a current condition of the resin material. Accordingly, molded articles of a high quality can be produced.

Having now fully described the invention, it will be apparent to one of ordinary skill in the art that many changes and modifications can be made thereto without departing from the spirit and scope of the invention as set forth herein.

What is claimed is:

1. In a method of controlling a hydraulic press wherein, when at least one of a pair of metal mold halves is moved by a hydraulic cylinder to compression mold a work within a cavity defined between said metal mold halves, the velocity of movement of said at least one metal mold half by said hydraulic cylinder toward the work is controlled until pressurization of the work is started, but after starting of the pressurization, the pressurizing force of said hydraulic cylinder is controlled, the improvement wherein:
   (a) a position of a movable member which is moved by said hydraulic cylinder is successively detected during the velocity control, and
   (b) changing over from the velocity control to the pressure control is effected at a point of time when the detected position of said movable member coincides with a preset value.

2. In a method of controlling a hydraulic press wherein, when at least one of a pair of metal mold halves is moved by a hydraulic cylinder to compression mold a work within a cavity defined between said metal mold halves, the velocity of movement of the metal mold half by said hydraulic cylinder is controlled until pressurization of the work is started, but after starting of the pressurization, the pressurizing force of said hydraulic cylinder is controlled, the improvement wherein changing over from the velocity control to the pressure control is effected at a point of time when said hydraulic cylinder is moved to a position of a predetermined stroke value $Z_0$ and an internal pressure P of said cavity is detected upon such changing over and is compared with a predetermined preset internal pressure $P_0$ to obtain a stroke modifying amount $\overline{VZ}$ for modifying the internal pressure P of said cavity to the predetermined internal pressure $P_0$ in accordance with an equation $$\overline{VZ} = \alpha(P_0 - P)$$

where $\alpha$ is a coefficient, and then a stroke value of said hydraulic cylinder at which changing over from velocity control to pressure control is to be effected in a subsequent next molding cycle is modified to $Z_0 + \overline{V}Z$, and wherein such modification is repeated for each molding cycle.

* * * * *